(12) United States Patent
Redford et al.

(10) Patent No.: US 11,741,368 B2
(45) Date of Patent: Aug. 29, 2023

(54) IMAGE SEGMENTATION

(71) Applicant: Five AI Limited, Bristol (GB)

(72) Inventors: John Redford, Cambridge (GB); Sina Samangooei, Cambridge (GB)

(73) Assignee: Five AI Limited, Cambridge (GB)

( * ) Notice: Subject to any disclaimer, the term of this patent is extended or adjusted under 35 U.S.C. 154(b) by 0 days.

(21) Appl. No.: 16/972,395

(22) PCT Filed: Jun. 6, 2019

(86) PCT No.: PCT/EP2019/064826
§ 371 (c)(1),
(2) Date: Dec. 4, 2020

(87) PCT Pub. No.: WO2019/234175
PCT Pub. Date: Dec. 12, 2019

(65) Prior Publication Data
US 2021/0232851 A1 Jul. 29, 2021

(30) Foreign Application Priority Data
Jun. 7, 2018 (GB) .................................... 1809345

(51) Int. Cl.
*G06K 9/62* (2022.01)
*G06K 9/46* (2006.01)
(Continued)

(52) U.S. Cl.
CPC ......... *G06N 3/084* (2013.01); *G06F 18/2148* (2023.01); *G06F 18/24323* (2023.01); *G06V 10/454* (2022.01); *G06V 10/764* (2022.01);
*G06V 10/771* (2022.01); *G06V 10/82* (2022.01); *G06V 20/588* (2022.01)

(58) Field of Classification Search
CPC .... G06V 10/751; G06V 10/40; G06K 9/6257; G06K 9/6282
See application file for complete search history.

(56) References Cited

U.S. PATENT DOCUMENTS

| 9,442,487 | B1 | 9/2016 | Ferguson et al. | |
|---|---|---|---|---|
| 2011/0320454 | A1* | 12/2011 | Hill | ........................ G06K 9/626 |
| | | | | 707/E17.046 |
| 2019/0102646 | A1* | 4/2019 | Redmon | ................ G06V 20/20 |

OTHER PUBLICATIONS

Meletis et al., "Training of Convolutional Networks on Multiple Heterogeneous Datasets for Street Scene Semantic Segmentation", Mar. 15, 2018, arXiv:1803.05675v1 (6 pages) (Year: 2018).*

(Continued)

*Primary Examiner* — David F Dunphy
(74) *Attorney, Agent, or Firm* — Greenberg Traurig, LLP; Andrew J. Tibbetts

(57) ABSTRACT

In one aspect, hierarchical image segmentation is applied to an image formed of a plurality of pixels, by classifying the pixels according to a hierarchical classification scheme, in which at least some of those pixels are classified by a parent level classifier in relation to a set of parent classes, each of which is associated with a subset of child classes, and each of those pixels is also classified by at least one child level classifier in relation to one of the subsets of child classes, wherein each of the parent classes corresponds to a category of visible structure, and each of the subset of child classes associated with it corresponds to a different type of visible structure within that category.

16 Claims, 16 Drawing Sheets

(51) Int. Cl.
  *G06N 3/084* (2023.01)
  *G06F 18/214* (2023.01)
  *G06F 18/243* (2023.01)
  *G06V 10/764* (2022.01)
  *G06V 10/771* (2022.01)
  *G06V 10/82* (2022.01)
  *G06V 10/44* (2022.01)
  *G06V 20/56* (2022.01)

(56) References Cited

OTHER PUBLICATIONS

PCT/EP2019/064826, Sep. 10, 2019, Invitation to Pay Additional Fees.
PCT/EP2019/064826, Nov. 6, 2019, International Search Report and Written Opinion.
International Search Report and Written Opinion for International Application No. PCT/EP2019/064826 dated Nov. 6, 2019.
Invitation to Pay Additional Fees for International Application No. PCT/EP2019/064826 dated Sep. 10, 2019.
Meletis et al., Training of convolutional networks on multiple heterogeneous datasets for street scene semantic segmentation. ArXiv preprint arXiv: 1803.05675v2. Jul. 8, 2018;2:6 pages.
Wang et al., Learning deep representations for scene labeling with semantic context guided supervision. ArXiv preprint arXiv: 1706.02493v2. Jun. 9, 2017;2:1-13.
Zhang et al., Deep learning of path-based tree classifiers for large-scale plant species identification. 2018 IEEE Conference on Multimedia Information Processing and Retrieval (MIPR). Apr. 10, 2018:25-30.
European Search Report in EP 19730133.6; by: Lothar Hermes, dated Oct. 13, 2022 (7 pages).
Fu et al., "CNN with coarse-to-fine layer for hierarchical classification," IET Computer Vision, May 31, 2018, vol. 12, No. 6, pp. 892-899.

* cited by examiner

Conv

IMAGE SEGMENTATION

RELATED APPLICATIONS

This application is a national stage filing under 35 U.S.C. 371 of International Patent Application Serial No. PCT/EP2019/064826, filed Jun. 6, 2019, which claims priority to United Kingdom patent application number GB1809345.0, filed Jun. 7, 2018.

TECHNICAL FIELD

This disclosure relates to image segmentation.

BACKGROUND

An autonomous vehicle, also known as a self-driving vehicle, refers to a vehicle which has a sensor system for monitoring its external environment and a control system that is capable of making and implementing driving decisions autonomously using those sensors. This includes in particular the ability to automatically adapt the vehicle's speed and direction of travel based on inputs from the sensor system. A fully autonomous or "driverless" vehicle has sufficient decision making capability to operate without any input from a human driver. However the term autonomous vehicle as used herein also applies to semi-autonomous vehicles, which have more limited autonomous decision-making capability and therefore still require a degree of oversight from a human driver.

Autonomous decision making is a critical function of an autonomous vehicle. This is true whatever its level of autonomy, but as the level of autonomy increases, so too does the complexity of the decisions it needs to be able to make safely, to the point where a fully autonomous vehicle needs to be equipped with an exceptionally robust decision making engine that can be relied upon to safely handle any driving scenario it encounters, however unexpected.

One factor that can limit the decision making capability of an autonomous vehicle is its ability to interpret sensor inputs, such as captured images of its surroundings, even when those sensor inputs are imperfect.

SUMMARY

The present disclosure provides a hierarchical image segmentation (pixel-level classification) scheme, which can be implemented a suitably trained convolutional neural network (CNN) (or any other suitable image segmentation system). The scheme allows the network to provide some information about a pixel even when it is uncertain what the full classification of the pixel is. For example, a pixel might be part of a centreline road marking, but the network might not be confident of this. Nevertheless the network might still be certain that the pixel is part of a road (as opposed to a tree say). The hierarchical structure allows the network to be confident a pixel is road even when it is not confident of finer grain distinctions, and the hierarchical structure of the segmentation scheme provides a way to express this result.

In the context of autonomous vehicle decision making, one aspect of robustness is the provision of one or more default actions to be taken in a "worst case scenario", in which the autonomous vehicle determines that the overall quality of its sensor inputs has reduced to a level at which it is no longer safe for it to continue. A default action could for example be coming to a complete stop in as short a time as can be safely achieved, or (in the case of a semi-autonomous vehicle) triggering an alert to a human driver and reverting to manual control. However, such extreme action should not be taken when it can be safely avoided, and an important capability of a useful autonomous vehicle is for it to be able to implement autonomous decision making safely based on imperfect sensor inputs, such as captured images, without resorting to default actions unnecessarily.

When the hierarchical classification scheme is used as a basis for decision making in this context, this significantly reduces the number of scenarios in which default actions are required, as compared with conventional image classification techniques, because certain types of decision can be taken safely based on a higher level classification of certain pixels even when fine grained (lower level) classification of those pixels is not available with sufficient certainty.

However it is noted that the invention may be applied to any image segmentation problem where it is desirable to learn a semantic hierarchy of visual structure at the pixel level, in contexts other than autonomous driving.

A first aspect of the present invention provides a computer-implemented method of classifying pixels of an image, the method comprising: receiving an image formed of a plurality of pixels; and classifying the pixels according to a hierarchical classification scheme, in which at least some of those pixels are classified by a parent level classifier in relation to a set of parent classes, each of which is associated with a subset of child classes, and each of those pixels is also classified by at least one child level classifier in relation to one of the subsets of child classes, wherein each of the parent classes corresponds to a category of visible structure, and each of the subset of child classes associated with it corresponds to a different type of visible structure within that category.

It is generally easier to make classifications higher up the hierarchy, in that pixel classifications can be made in relation to the set of parent classes with a sufficient level of certainty even for lower quality images or image regions (e.g. for distant low-resolution structure, or in the presence of noise, distortion, obfuscation etc.), for which it may not be possible to make classifications with a sufficient level of certainty in relation to at least one of the associated subsets of child classes. However, for higher quality images/image regions, classifications can be made in relation to that subset of child classes with a sufficient level of certainty and in that event provide additional granularity that complements the classification in relation to the set of parent classes.

In the described embodiments of the invention, this hierarchical classification is used as a basis for decision making in an autonomous vehicle, to exploit the fact that certain types of decision can be safely made based on a higher-level classification of certain pixels even when a lower-level classification cannot be made of those pixels with a sufficient level of certainty. That is, certain decisions can be made safely on the basis that a particular set of correspond to a particular category of road structure (i.e. on the basis of a successful higher-level classification), without having to be sure of the specific type of road structure in that category (i.e. notwithstanding the failure of a lower-level classification) at that point in time. When it does become possible to identify the type of road with certainty, this additional granularity can feed into the decision making process as needed or desired. For example, in the case of initially distant road structure, it may be possible to classify these as "road" but not as a specific type of road ("lane", "marking" etc.), and this level of classification may be sufficient for making certain types of decision. As the vehicle moves towards the road structure, there will come a point when the type of road can be identified with sufficient certainty for those pixels, and that information can in turn can be used by the decision engine as and when it is useful or needed.

That is, in embodiments of the invention, the method may comprise performing, by a controller, a decision making process (such as an autonomous vehicle control process) based on the pixel classifications. The controller may, in performing the decision making process, detect a failure of the child level classifier to classify at least one of the pixels, and make a decision based on the classification of that pixel by the parent level classifier.

Another benefit of the hierarchical classification scheme is that it allows training of segmentation convolution neural networks (or other trainable image segmentation systems) from partially annotated (labelled) data. For example some training images may show only the road vs. not road distinction, where as other training images might have labels for lane markings and road edges as well as just road/not-road areas. This is because the way in which the hierarchy is structured makes it possible to provide a learning mechanism that can take error signals at various levels of the hierarchy whilst accounting for non-annotated regions at any level of their hierarchy. Training is performed to minimize the resulting error signals across the hierarchy as a whole in relation to annotated training images.

In embodiments of the invention, non-annotated regions may be accounted for using what it referred to herein as "masking", wherein any region of an image that is not annotated at a given level of the hierarchy in relation to a given set of classes does not contribute to a corresponding error signal defined at that level of the hierarchy, such that the classifier cannot be "penalized" during training for the way in which it chooses to classify those pixels at that level of the hierarchy in relation to that class of pixels. This is illustrated by example in the following table:

| | Image 1 | | | Image 2 | |
|---|---|---|---|---|---|
| Parent Classes: Road (class A1) and Not Road (class A2) | | | | | |
| Pixel Set X | Annotated as Road | Error signal defined for Parent Classes penalizes classifications of pixels X and Y that deviate from their Road/Not Road annotations. | Pixel Set X' | Annotated as Road | Error signal defined for Road and Not Road classes, which penalizes classifications of pixels X' and Y' that deviate from their Road/Not Road annotations. Drives training of Road/Not Road parent classifier. |
| Pixel Set Y | Annotated as Not Road | | Pixel Set Y' | Annotated as Not Road | |
| Road (A1) Child Classes: Lane (class B1) and Marking (class B2) | | | | | |
| Pixel Set X1-subset of Pixel Set X | Annotated as Lane | Error signal defined for Road Child Classes penalizes classifications of pixels X1 and X2 that deviate from their Lane/Marking annotations. Classifier may still classify | Pixel Set X | Not annotated in relation to Road Child Classes | Zero-error signal for Road Child Classes |
| Pixel Set X2-subset of | Annotated as Marking | | | | |

| Image 1 | | | Image 2 | |
|---|---|---|---|---|
| Pixel Set X Pixel Set Y | Not annotated in relation to Road Child Classes | Pixel Set Y (Not Road) in relation to Road Classes, but these do not contribute to error signal for Road Child Classes. Etc. | Pixel Set Y | Not annotated in relation to Road Child Classes |

In embodiments, the method may comprise performing, by a controller, a decision making process based on the pixel classifications.

The method may comprise, in performing the decision making process, detecting a failure of the child level classifier to classify at least one of the pixels, and making a decision based on the classification of that pixel by the parent level classifier.

The decision making process may be an autonomous vehicle control process.

The child level classifier may determine at least one child classification value which classifies that pixel in relation to a child class of that subset of child classes, and the parent level classifier may determine at least one parent classification value which classifies that pixel in relation to the parent class with which that subset of child classes is associated.

The child level classifier may determine for that pixel at least one conditional classification value in relation that child class which is conditional on that parent class, and determine the child classification value based on the conditional classification value and the parent classification value.

The child level classifier may determine the child classification value by multiplying the parent classification value with the conditional classification value.

The parent and child classification values may be values denoting a probability of that pixel belonging that parent class and that child class respectively.

The conditional classification value may be a value denoting a conditional probability of that pixel belonging to that child class on condition that it belongs to that parent class.

The method may comprise generating, by a feature extractor, a plurality of pixel feature vectors, each representing one of the pixels, based on that pixel and a set of the pixels related thereto, wherein the pixels are classified based on their pixel feature vectors.

The set of related pixels may be formed of the pixels in a portion of the image surrounding that pixel.

The feature extractor may be formed of one or more layers of a neural network.

The feature extractor may be formed of multiple layers of a convolutional neural network.

Each feature vector may be processed according to learned feature vector modification parameters in order to generate: a modified feature vector for the set of parent classes, which is used to classify the pixel it represents in relation to the set of parent classes; and a modified feature vector for each subset of child classes, which is used to classify that pixel in relation to that subset of child classes.

The modified feature vector for each subset of child classes may be combined with the modified feature vector for the set of parent classes, to determine a combined feature vector for that subset of child classes, which is used to classify that pixel in relation to that subset of child classes.

The child level classifier may determine a child classification value for each of the subset of child classes.

The parent level classifier and the child level classifier may be probabilistic classifiers, which determine a probability distribution over the set of parent classes and the subset of child classes respectively.

Each of those pixels may be classified by at least one of: a first child level classifier in relation to a first subset of child classes associated with a first of the parent classes, and a second child level classifier in relation to a second subset of child classes associated with a second of the parent classes.

Each of at least some of the pixels may be classified by the parent level classifier, the child level classifier, and at least one further child level classifier in relation to a further set of child classes, the further child level classifier being a child of the child level classifier in that each of the further set of child classes is a child of a child class in the subset of child classes within the hierarchical classification scheme.

Each of at least some of the pixels may be classified by the parent level classifier, the child level classifier, and at least one further parent level classifier in relation to a further set of parent classes, the further parent level classifier being a parent of the parent level classifier in that each of the parent classes is a child of a parent class in the further set of parent classes.

A second aspect of the present invention provides a computer-implemented method of training image pixel classifiers, the method comprising: receiving an image formed of plurality of pixels; receiving labelling data for labelling at least some of the pixels according to a hierarchical classification scheme, in which each of those pixels is labelled as belonging to one of a set of parent classes, each of which is associated with a subset of child classes, and each of those pixels is also labelled as belonging to one of the subset of child classes associated with the parent class to which it belongs, wherein each of the parent classes corresponds to a category of visible structure, and each of the subset of child classes associated with it corresponds to a different type of visible structure within that category; and using data of the pixels and the labelling data to train a parent level classifier to classify image pixels in relation to the set of parent classes, and at least one child level classifier to classify image pixels in relation to the subset of child classes associated with one of the parent classes.

In embodiments, the classifiers may be trained by using the classifiers to classify each of the pixels in relation to the set of parent classes and each subset of child classes, determining respective error signals for the set of parent classes and each subset of child classes respectively, and adapting parameters of the classifiers to minimize the error signals;

The error signal for the set of parent classes may provide a measure of difference between the label data for the set of parent classes and the results of the pixel classifications performed in relation to the set of parent classes.

The error signal for each subset of child classes may provide a measure of difference between the label data for that subset of child classes and the results of the pixel classifications performed in relation to that subset of child classes. Any pixels which are not labelled in relation that subset of child class does not contribute to the error signal for that subset of child classes.

In that event, any pixels which are not labelled in relation that subset of child classes may still be classified in relation to that subset of child classes but the results thereof does not contribute to the error signal for that subset of child classes.

The may be performed for multiple images, at least one of which is not labelled at all in relation to at least one of the subsets of child classes, such that the error signal for that image and that subset of child classes is always a zero-error signal.

The data of the pixels may comprise a plurality of pixel feature vectors, each representing one of the pixels, as generated by a feature extractor based on that pixel and a set of the pixels related thereto.

Parameters of the feature extractor may be adapted in training along with the parameters of the classifiers in order to minimize the error signals.

Each feature vector may be processed according to feature vector modification parameters in order to generate: a modified feature vector for the set of parent classes, which is used to classify the pixel it represents in relation to the set of parent classes; and a modified feature vector for each subset of child classes, which is used to classify that pixel in relation to that subset of child classes.

The feature vector modification parameters may be adapted in training along with the parameters of the feature extractor and the classifiers in order to minimize the error signals.

The modified feature vector for each subset of child classes may be combined with the modified feature vector for the set of parent classes, to determine a combined feature vector for that subset of child classes, which is used to classify that pixel in relation to that subset.

The modified feature vectors may be combined by concatenating them.

The error signals may be combined in a cost function which is minimized in training.

Another aspect of the invention provides a hierarchical classifier embodied as a computer system comprising one or more processors configured to: process a set of inputs to determine a feature vector for each of the inputs; modify the feature vector for each of the inputs, to generate a modified parent-level feature vector; classify each of the inputs in relation to at least one parent class based on the modified parent-level feature vector; modify the feature vector for each of the inputs, to generate a modified child-level feature vector; determine a combined feature vector for each of the inputs by combining the child-level feature vector for that input with the parent-level feature vector for that input; and classify each of the inputs in relation to a set of child classes based on the combined feature vector, the set of child classes being children of the parent class within a classification hierarchy.

In embodiments, each of the inputs may be a pixel of an image.

Another aspect provides a method of training the above hierarchical classifier to learn the set of parameters by: receiving a set of training inputs having respective training labels, at least some of which are labelled as belonging to the parent class and to one of the child classes; using the hierarchical classifier to classify each of the inputs in relation to: (i) the at least one parent class and (ii) the set of child classes; determining an error signal for the at least one parent class by comparing the results of (i) with the parent class labels; determining an error signal for the set of child classes by comparing the results of (ii) with the child class labels; adapting the parameters to minimize the determined error signals.

Another aspect provides a hierarchical image segmentation system configured to implement any of the steps or functions disclosed herein.

Another aspect provides a computer program comprising computer readable instructions stored on a non-transitory storage medium and configured, when executed on one or more processors, to cause the one or more processors to implement any of the steps or functions disclosed herein.

BRIEF DESCRIPTION OF FIGURES

For a better understanding of the present invention, and to show how embodiments of the same may be carried into effect, reference is made by way of example to the following figures in which.

DETAILED DESCRIPTION

Figure 1:
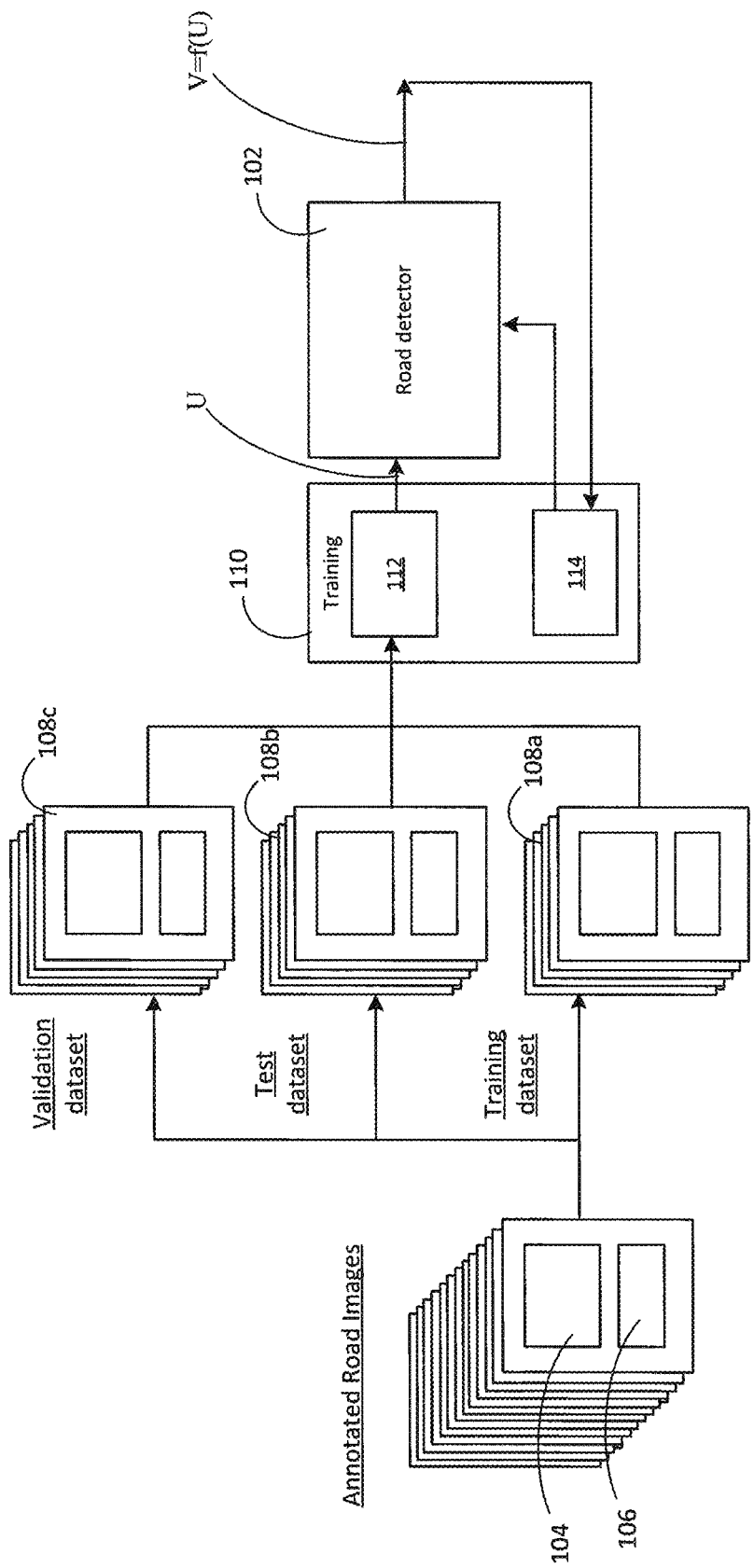
FIG. 1 shows a highly schematic block diagram of a system for training a road detection component based on machine learning.

In the field of autonomous driving, a need may arise for a road or other structure detection component (also referred to as a machine vision component) that when given a visual input can determine real-world structure, such as road or lane structure, e.g. which part of the image is road surface, which part of the image makes up lanes on the road, etc. In particular, structure detection feed into decision machining by an autonomous vehicle decision engine.

In the described embodiments of the invention, structure detection is implemented using a hierarchical classification scheme as applied to image pixels individually, and is used in turn as a basis for such decision making.

A benefit of the hierarchical classification scheme is that, even when it is not possible to classify a particular pixel with sufficient certainty in relation to a lower-level class in the hierarchy, for certain types of decision, the decision engine may nonetheless be able to 'fallback' on a higher-level classification when it has detected failure of a lower-level classification further down the hierarchy. That is, although in extreme cases a default action may be implemented in response to a failure to classify a certain set of pixels with sufficient certainty, in other circumstances the decision engine may nonetheless be able to make certain types of decision safely by selecting one of a range of options based on a higher-level classification that can be made with sufficient certainty in respect of that set of pixels, possibly whilst safely deferring other types of decision that require the lower-level classification(s).

In the context of image processing, classification refers to the task of identifying structure within images. Classification may be performed at the image level, i.e. classifying an image as a whole in relation to a set of image structure classes. Classification may also be performed at the level of the structure within the images, by classifying pixels of the image individually depending on which structure they form part of, which is also referred to as "segmentation" or pixel-level classification herein.

This is preferably implemented with machine learning using convolutional neural networks that are trained using training images. These training images are like the images that will be seen from cameras in the autonomous vehicle, but they have been annotated with the information that the neural network is required to learn. For example, they will have annotation that marks which pixels on the image are the road surface and/or which pixels of the image belong to lanes. At training time, the network is presented with thousands, or preferably hundreds of thousands, of such annotated images and learns itself what features of the image indicate that a pixel is road surface or part of a lane etc. At run time, the network can then make this determination on its own with images it has never seen before. The training images can be annotated manually for training. The training images can for example be frames taken from a set of video images.

FIG. 1 shows a highly schematic function block diagram of a training system for training a structure detection component 102 based on annotated street scene images (also referred to as road images herein). That is, street scene images having associated image annotation data. In FIG. 1, a street scene image is labelled 104 and its corresponding image annotation data is labelled 106. The annotation data 106 marks the location(s) of certain structure(s) within the image 104, such as roads, lanes, junctions, non-drivable areas etc. and possibly objects within the images, such as other vehicles, pedestrians, street signage or other infrastructure etc.

The images may be divided into training, test and validation datasets, labelled 108a, 108b and 108c respectively.

The detection component 102 takes as an input image data of a street scene image, labelled U, and generates an output V=f(V) where f is a function defined by a set of model parameters of the detection component 102.

The detection component 102 is trained based on the training images 108a so as to match its output $f(U)$ to the corresponding annotation data. This is a recursive process, in which an input component 112 of a training system 110 systematically inputs image data of the training images 108b to the structure detector 102, and a training component 114 of the training system 110 adapts the model parameters in an attempt to optimize an objective function (also referred to as a cost or error function) that provides a measure of difference between the output F(U) and the corresponding annotation data 106 for each of the training images (cost or error).

The detection component 102 can for example be a convolutional neural network, where the model parameters are weightings between neurons.

The test data 108*b* is used to minimize over-fitting, which refers to the fact that, beyond a certain point, increasing the accuracy of the detection component 102 on the training dataset 108*a* is detrimental to its ability to generalize to images it has not encountered during training. Overfitting can be identified as the point at which increasing the accuracy of the detection component 102 on the training data 108 reduces (or does not increase) its accuracy on the test data, with accuracy being measured in terms of the objective function. The aim of training is to minimize the objective function to the extent it can be minimized without overfitting. The training can for example be based on backpropagation (backward propagation of errors), based on a computation of the gradient of the objective function with respect to the model parameters. In this context, the training component 112 may be referred to as a backpropagation component.

The validation dataset 108*c* can be used to provide a final assessment of the detection component's performance, if desired.

Figure 2:
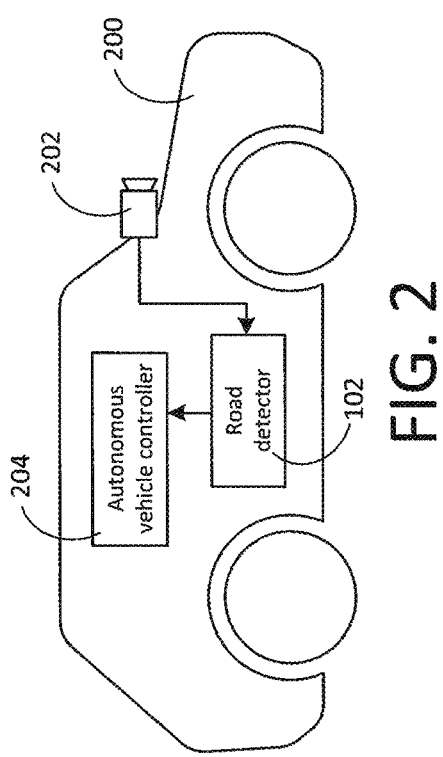
FIG. 2 shows a highly schematic block diagram of an autonomous vehicle.

FIG. 2 shows a highly-schematic block diagram of an autonomous vehicle 200, which is shown to comprise an instance of the trained detection component 102, having an input connected to an image capture device 202 of the vehicle 200 and an output connected to an autonomous vehicle controller 204. In use, the trained structure detection component 102 of the autonomous vehicle 200 detects structure within images captured by the image capture device 102, in real time, in accordance with its training, and the autonomous vehicle controller 204 controls the speed and direction of the vehicle based on the results, with no or limited input from any human. The vehicle 200 is a car in this example, but it can be any form of vehicle.

In the examples described below, the structure detector 102 is trained to detect road structure (an optionally other structure as well), and may be referred to in this context as a road detection component or road detector. However, the same techniques can equally be applied to other forms of visual structure, and have applications outside of autonomous driving.

The road detection component 102 and autonomous vehicle controller 204 are functional components of the autonomous vehicle 200 that represent certain high-level functions implemented within the autonomous vehicle 200. These components can be implemented in hardware or software, or a combination of both. For a software implementation, the functions in question are implemented by one or more processors of the autonomous vehicle 100 (not shown), which can be general-purpose processing units such as CPUs and/or special purpose processing units such as GPUs. Machine-readable instructions held in memory cause those functions to be implemented when executed on the one or more processors. For a hardware implementation, the functions in question can be implemented using special-purpose hardware such as application-specific integrated circuits (ASICs) and/or field programmable gate arrays (FPGAs).

The image capture device 202 can be a three-dimensional (3D) image capture device, which can capture 3D image data. That is, depth information about visual structure, in addition to information about its location within the image place of the camera. This can for example be provided using stereoscopic imaging, LIDAR, time-of-flight measurements etc. For example, the image capture device 202 can be a stereoscopic image capture device having a pair of stereoscopically-arranged image capture units (cameras). The image capture units each capture two dimensional images, but the arrangement of those cameras is such that depth information can be extracted from pairs of two-dimensional (2D) images captured by the cameras simultaneously, thereby providing three-dimensional (3D) imaging. However it will be appreciated that other forms of 3D imaging, which can provide depth information for a two-dimensional array of pixels, can be used in the present context. Although only one image capture device 202 is shown in FIG. 2, the autonomous vehicle could comprise multiple such devices, e.g. forward-facing and rear-facing image capture devices.

Note however that 3D images are not required for the purposes of the invention. The invention can be implemented using only a 2D image, so a single camera is sufficient. There may be many uses of the described hierarchical training and classification scheme that do not require 3D information.

As will be appreciated, the above a highly simplified description of certain autonomous vehicle functions. The general principles of autonomous vehicles are known, therefore are not described in further detail.

Figure 3:
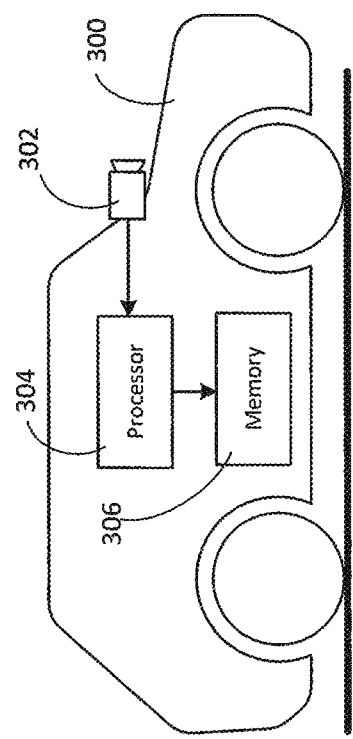
FIG. 3 shows a highly schematic block diagram of a vehicle for capturing street scene images for use in training.

FIG. 3 shows a simplified block diagram of a vehicle 300 that can be used to capture road images to be annotated, that is, road images of the kind described above with reference to FIG. 1. These images can be captured as frames of short video segments recorded as the vehicle 300 drives along a road. The vehicle 300 may be referred to as a training vehicle, as a convenient shorthand to distinguish it from the autonomous vehicle 200 of FIG. 2. The training vehicle 300 is shown to comprise an image capture device 302, which can be a forward-facing or rear-facing image capture device, and which is coupled to a processor 304. The processor 304 receives the captured images from the image capture device 302, and stores them in a memory 306, from which they can be retrieved for use in the manner described below.

The captured images can then be used to train the road detection component 102, as indicated above.

The road detection component 102 is trained to perform pixel-wise image classification, i.e. to separately classify individual pixels of each image. This is sometimes referred to in the art as image segmentation, in contrast to image classification which is about classifying an image as a whole. It is noted in this respect that, unless otherwise indicated, references to classification in the following description refer to pixel-level classification (i.e. segmentation) rather than classification at the image level.

In the embodiments of the invention described below, the road detection component 102 is trained to classify such images in accordance with a hierarchical classification scheme having at least two levels of road structure class. In accordance with the hierarchical classification scheme, an individual pixel can be classified in relation to multiple road structure classes at different levels of the hierarchy simultaneously. Each class at each of the level(s) other than the lowest level is directly associated with a subset of one or more of the classes at the level directly below it, the higher-level class being referred to as a parent class and the one or more classes directly associated with it being referred to as children of that parent class. Each parent class corresponds to a category of visible structure and (each of) its child class(es) corresponds to a (different) type of visible structure within that category. For a scheme with three or more levels, each class at any level other than the highest level is a child of a parent class one level above it. Any class at a level other than the lowest level can be a parent of one or more classes below that level, thus a class at a level other than the highest and lowest levels can be both a parent class and a child class. Thus at the top of the hierarchy, the highest level classes correspond to broad classes of road structure, as one moves down the hierarchy, the classes correspond to increasingly specific classes/types. An additional point of terminology to note is that a class that is both a parent class and a child class corresponds to a particular type of road structure class within the (broader) category of road structure to which its parent class corresponds, but equally corresponds to a (narrower) category of road structure with each of its own children classes corresponding to different types of road structure within that narrower road structure category. A class that is itself a child of a parent's child is referred to as a grandchild of that parent.

As the autonomous vehicle 200 travels, the image capture device 202 repeatedly captures images of the vehicle's immediate surroundings. The captured images are provided to the road detection component 102 and segmentation is applied to each of those images in real-time. The results are used as a basis for one or more decision-making processes implemented by a decision making engine of the controller 204, in which the controller 204 uses the knowledge of where the surrounding road structure is currently located relative to the vehicle 100 to make driving decisions autonomously.

Figure 4:
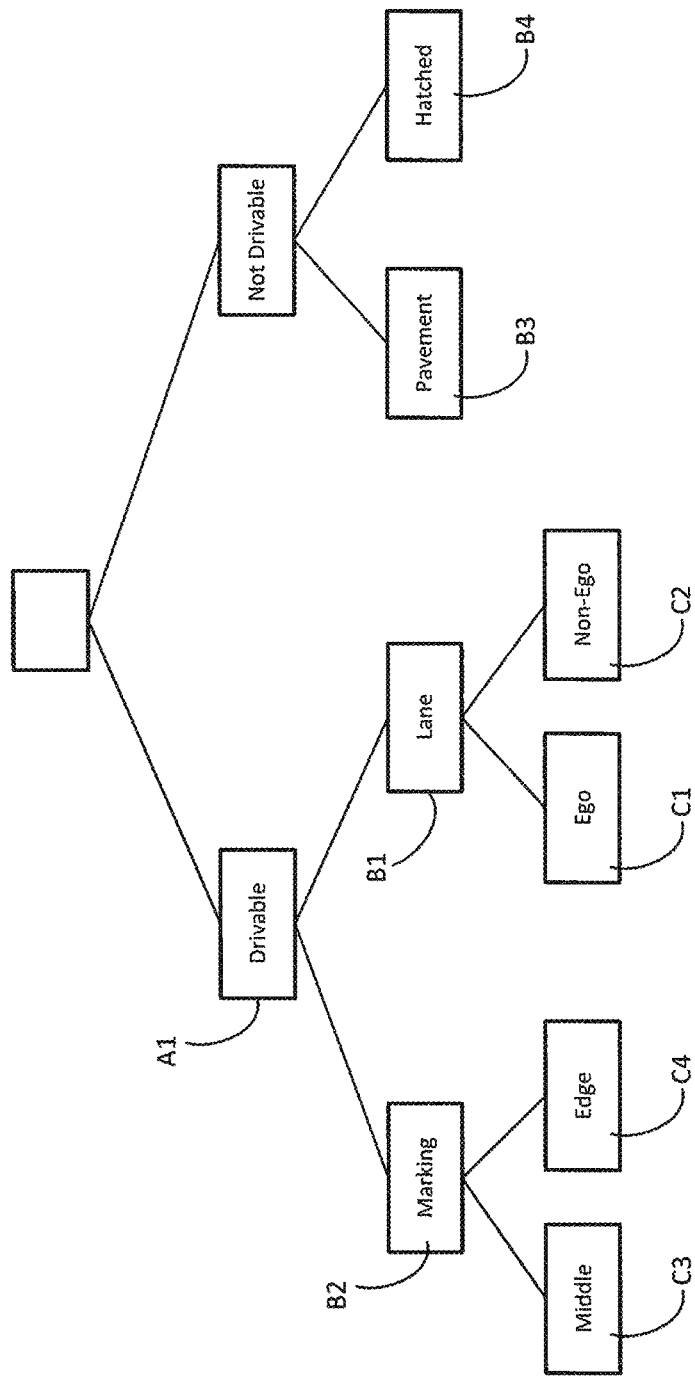
FIG. 4 shows an example of a hierarchical road structure classification scheme.

By way of example, FIG. 4 shows one example of a hierarchical road structure classification scheme having first, second and third levels—referred to as levels A, B and C respectively and labelled as such in the figures. Level A is the highest level, level C is the lowest, and level B is an intermediate level between levels A and C. As will be appreciated, this is just an example, and a hierarchical classification scheme can have any number of levels greater than one. At level A, there are two broad and, in this case, mutually exclusive classes of road structure, namely "drivable" (A1) (road) and "not drivable" (A2). Thus any pixel within an image can be classified as drivable (i.e. corresponding to a point in a region in which the vehicle 200 is able to drive) or not drivable (i.e. corresponding to a point in a region in which the vehicle 200 is not able to drive). The road class A1 has two child classes at level B: "marking" (B2) for pixels that are part of a road marking region, and "lane" (B1) which correspond to a point in a lane of a road. In turn, the lane class B1 has three child classes at level C: "ego lane" (C1) for pixels that are part of a lane in which the vehicle 200 is currently driving (the ego lane), "non-ego lane" (C2) for pixels that are not part of the ego-lane but are part of different lane in which the vehicle 200 is able to drive, i.e. where the vehicle 200 is allowed to switch lane if it is safe to do so. The marking class B2 has two child classes at level C: "edge" (C3) for pixels that are part of a marking region at the edge of a road and "middle" (C4) for pixels that are part of a marking region in the middle (i.e. not at the edge) of the road.

Generally speaking the sub-classifications should be exhaustive and exclusive. It would be possible to have multiple overlapping hierarchies trained in the same network which may be useful for some applications.

The non-drivable class A2 is shown to have two children at level B: "pavement"/"sidewalk" (B3), and "hatched" (B4) corresponding to hatched regions of the road in which no vehicle are permitted to drive (or similarly restricted regions).

It is however noted that in general a parent class can have any number of child classes.

In accordance with the scheme of FIG. 4, a pixel that is part of an ego lane may be assigned to classes C1 (ego lane), B1 (lane) and A1 (drivable) simultaneously or, in the case of a probabilistic (or other score-based) classification be assigned high probabilities (or other scores) for those categories. However, a benefit of this scheme is that, to take that pixel as an example, the road detector 102 may be reasonably certain that it belongs to a drivable region and to a lane (classes A1 and B1), but simultaneously uncertain as to whether it is an ego lane or non-ego lane. In that event, it is still able to classify that pixel in relation to classes A1 and B1 with a sufficiently high level of certainty, which may be a sufficient level of knowledge for at least some types of decision to be made by the controller 204, even though it is currently unable to classify it in relation to classes C1 and C2 with a sufficient level of certainty. That is, its successful classification of that pixel in relation to classes A1/A2 and B1/B2 may provide a sufficient basis for at least some types of decision making by the controller 204, notwithstanding the current failure of the road detector 102 to classify it in relation to classes C1/C2 lower down the hierarchy.

In other words, a benefit of the hierarchical classification scheme is that, even when the road detection component 102 is unable to classify a particular pixel with sufficient certainty in relation to a lower level class, for certain types of decision it may nonetheless be able to 'fallback' on a higher-level classification when it has detected failure of a lower level classification further down the hierarchy. That is, although in extreme cases the controller 204 implement a default action in response to a failure of the road detection component 102 to classify a certain set of pixels with sufficient certainty (e.g. stop safely as soon as possible), in other circumstances where the road detection component 102 is unable to classify certain pixels with sufficient certainty in relation to one or more of the lower-level classes, the controller 204 may nonetheless be able to make certain types of decision safely by selecting one of a range of options based on a higher-level classification that can be made with sufficient certainty in respect of that set of pixels, possibly whilst safely deferring other types of decision that require the lower-level classification(s). The hierarchical classification scheme thus provides a "middle ground" for the controller 204, where it can continue to operate safely when it knows that the lower-level classification has failed for certain pixels but that the higher-level classification of those pixels is still reliable, by adapting its decision making accordingly, without having to resort to a full-failure default mode of operation.

One example is where different parts of the system require different levels of detailed segmentation.

Another example might be that the system might take some information from vision and some from a map depending on how detailed the vision detection is. E.g. take lanes from segmentation if they exist, but if they don't then use the road segmentation but divide it up by the number of lanes the map indicates.

Although in the above each parent class has a two or three children, a given parent class can have any desired number of children. Indeed, any further or alternative road structure classes can be chosen in any way that respects the underlying principles of hierarchical classification.

As will be appreciated, this classification scheme can be implemented in conjunction with any segmentation methods that can be used to classify pixels in relation to the road structure classes within the hierarchy. The described method can in general be implemented with any form of machine learning component that can learn hierarchies.

Preferred embodiments of the invention are described below, which use a convolutional neural network (CNN) as a basis for the road structure detection. First, some useful context around CNNs will be described, however it is noted that this is not exhaustive and is provided by way of example only. CNNs can be implemented with various different architectures and components and, as will be appreciated, the method described herein can be implemented using any suitable CNN architecture, or indeed any machine learning architecture that is capable of learning pixel embeddings.

What is material for the purposes of implementing the hierarchical classification scheme provided herein is the provision of a learning mechanism that can take error signals at various levels of the hierarchy. This is independent of the exact structure of the CNN. Indeed different styles of CNN feature extractor with significantly different structures can be used in conjunction with a general purpose hierarchical back end that performs hierarchical classification based on pixel feature vectors extracted by the feature extractor. The feature vector as provided by the feature extractor is manipulated as described below in order to perform the hierarchical classification.

Figure 5:
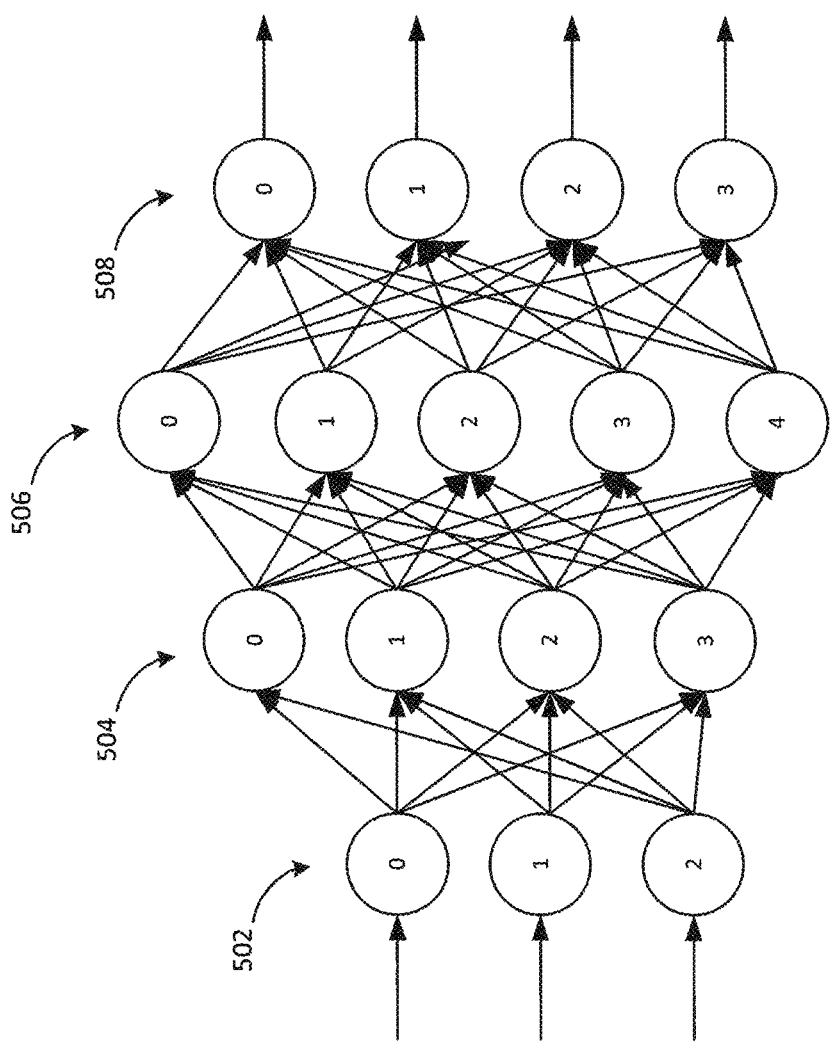
FIG. 5 shows a schematic block diagram of a classical neural network structure.

FIG. 5 shows a schematic block diagram representing a conventional structure for an artificial neural network structure 500, shown to have a plurality of processing layers 502 (input layer), 504, 506 (first and second hidden layers) and 508 (output layer). Although two hidden layers are shown in FIG. 5, a neural network can have any number of hidden layers (or none at all). Each layer is shown to comprise a number of processing nodes, also referred to as "neurons". Each node is represented as a circle containing an integer denoting an index of that node within its layer. FIG. 5 depicts a feed-forward architecture, in which each node of the input layer 502 has an input for receiving an input value, which is defined as a component of an input vector received at the input layer 502. Each node of the first hidden layer 504 has inputs, each of which is connected to an output of a different one of the nodes of the input layer 502 for receiving a computed value therefrom (output value of input layer 502, input value to the first hidden layer 504); each node of the second hidden layer 506 has inputs, each of which is connected to an input of a different one of the nodes of the first hidden layer 504 for receiving a computed value therefrom (output value of the first hidden layer 504, input value to the second hidden layer 506); and each node of the output layer 508 has inputs, each of which is connected to an output of a different one of the nodes of the second hidden layer 506 (output value of the second hidden layer 506, input value to the output layer 508), and an output configured to provide a value (output value of the output layer 508), which is a component of an output vector at the output layer 508. A neural network layer in which every node is connected to every node in the previous layer may be referred to as a "fully connected" layer and, in a classical neural network architecture, all layers are fully connected. The input layer 502 does not compute new values as such, but rather is a convenient way of representing the ability of the neural network to receive a set of input values (input vector) for processing within the network. As such, the output value of each node of the input layer 502 matches its input value. Each of the nodes in the remaining layers 504-508 computes its output value by processing their input values as received from the nodes in the previous layer. The output value at each node is computed as a function of a weighted sum of its inputs as received from the nodes to which it is connected, which can be expressed mathematically as follows:

$$v_i = g\left(\sum_j w_{i,j} u_j\right)$$

where $v_i$ denotes the output value of node i in a given layer, $u_j$ denotes the jth input received at that node, $w_{i,j}$ denotes a weight applied at that node to input value $u_j$, and g denotes the function applied at that node (activation function). The weights $w_{i,j}$ across the nodes and layers constitute model parameters, which are tuned during training in the manner outlined above with reference to FIG. 1. A "bias term" can be incorporated in the above, by fixing $u_0=1$, such that $w_{i,0}$ becomes the bias term (sometimes this is written as a separate term in the equation), with the bias terms being likewise adapted during training. When properly trained in this way, the neural network is able to generalize its training to examples it has never encountered before, as noted above. Much power of neural networks stems from the use of a non-linear activation function g at one or more of the layers, as this what allows the architecture of the neural network to be exploited to its full potential.

Neural network per se are known, and for that reason the general principles of a neural network are not described in further detail herein.

As indicated above, a particular convolutional neural network (CNN) architecture is used in the road detection component 102 in the present example.

Figure 6:
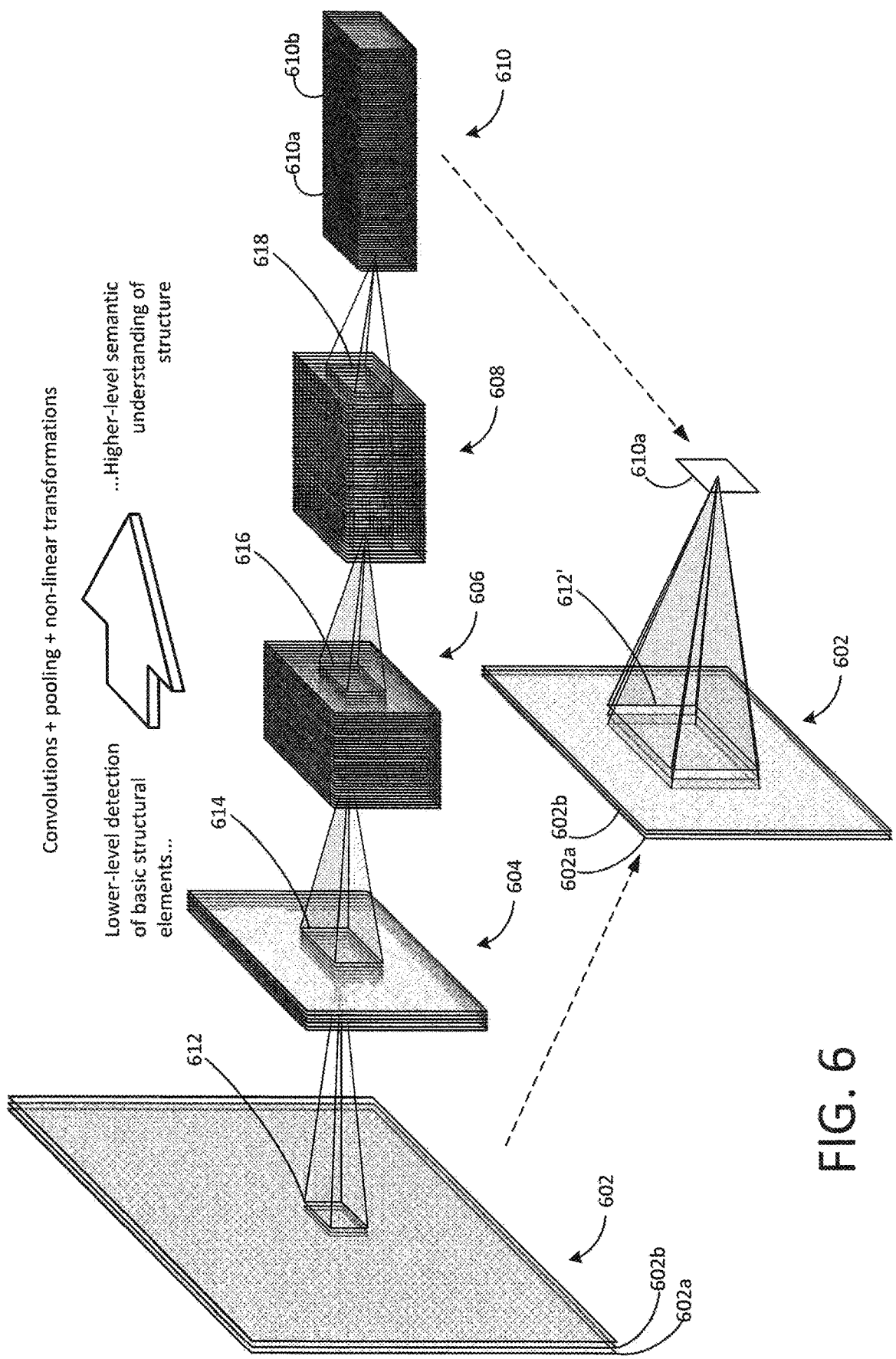
FIG. 6 shows an example of processing performed within a convolutional neural network.

With reference to FIG. 6, it is useful to conceptualize the inputs to and outputs of the layers of a CNN as "volumes" in a discrete three dimensional space (i.e. three dimensional arrays), each formed of a stack of two-dimensional arrays. Each two-dimensional array in the stack is also referred to herein as a "data layer" and, in some contexts, a "feature map". It is thus noted that the term "layer" may be used herein to refer to a processing layer of a neural network, and also to a data layer in a stack of data layers that constitute an input or output volume. It will be clear in context which is meant.

By way of example FIG. 6 shows a sequence of five such volumes 602, 604, 606, 608 and 610 that may be generated through a series of convolution operations, pooling operations and non-linear transformations, in the manner described below. For reference, two data layers within the first volume 602 are labelled 602a and 602b respectively, and two data layers within the fifth volume 610 are labelled 610a and 610b respectively.

Each value in a volume can be assigned a discrete location in three dimensions (index triplet), denoted (x,y,z), where z is an index of the data layer to which that value belongs (distance along the stack) and (x,y) are indexes defining its position within that data layer (i.e. within the plane of the data layers). Herein, the input volume to a given layer is denoted U and the output volume of a given layer is denoted V, noting that an input volume U to one layer can comprise or be derived from the output volume V to another. The values at position (x,y,z) in volumes U and V are denoted $u_{x,y,z}$ and $v_{x,y,z}$ respectively, and the data layers at depth z in volumes U and V are denoted $K_z$ and $L_z$ respectively, such that $u_{x,y,z}$ and $v_{x,y,z}$ are the values at position (x,y) in data layers $K_z$ and $L_z$ respectively, In turn, a three dimensional position (x,y,x) can be assigned to each node in a given processing layer of the CNN, where the node at position (x,y,z) in that processing layer computes value $v_{x,y,z}$ of the output volume V. It is noted in this respect that, whilst the term data layer refers to a two-dimensional data structure, the term processing layer refers to a three dimensional node structure when considered from this perspective.

Each volume has a width and height (extent in the x and y directions respectively) and depth (extent in the z direction). The depth is the number of data layers within the volume. The width and height can vary with z (i.e. be different at different data layers) in that different data layers could contain a different number of values, although it may be more convenient to use padding or a comparable technique where necessary to ensure each volume has the same width and height at all depths.

A CNN differs from a classical neural network architecture in that it has processing layers that are not fully connected. Rather, processing layers are provided that are only partially connected to other processing layer(s). In particular, each node in a convolution layer is connected to only a localized 3D region of the processing layer(s) from which it receives inputs and over which that node performs a convolution with respect to a filter, as described in further detail later. The localized partial connections from one layer to the next respect the (x, y) positions of values within their respective volumes, as described below, such that (x,y) position information is at least to some extent preserved within the CNN as data passes through the network.

To illustrate this in the context of image processing, consider the case where the volume 602 is an image received at the input layer of a CNN. For a colour image with three colour channels, such as red-green-blue (RGB), the image volume 602 has a depth of three, with z=0, 1, 2 corresponding to the three colour channels respectively, and the value at (x,y) in data layer z being the pixel value of the corresponding colour channel at position (x,y) in the image. That is, the output values $v_{x,y,0}$, $v_{x,y,1}$ and $v_{x,y,2}$ of the input layer are the pixel values at position (x, y) in the image for the three colour channels respectively.

It is noted that, although it is usefully to consider the image as a three dimensional structure in this manner, in the absence of physical depth information associated with the pixels, this is nonetheless a 2D image in the sense described above. It is also noted that the term depth may be used herein in relation to images to refer to both the number of color channels in the context of CNN processing and to refer to physical pixel depth, i.e. distance from the device that captured it in the case of a captured 3D image. It will be clear in context what is meant.

Figure 7A:
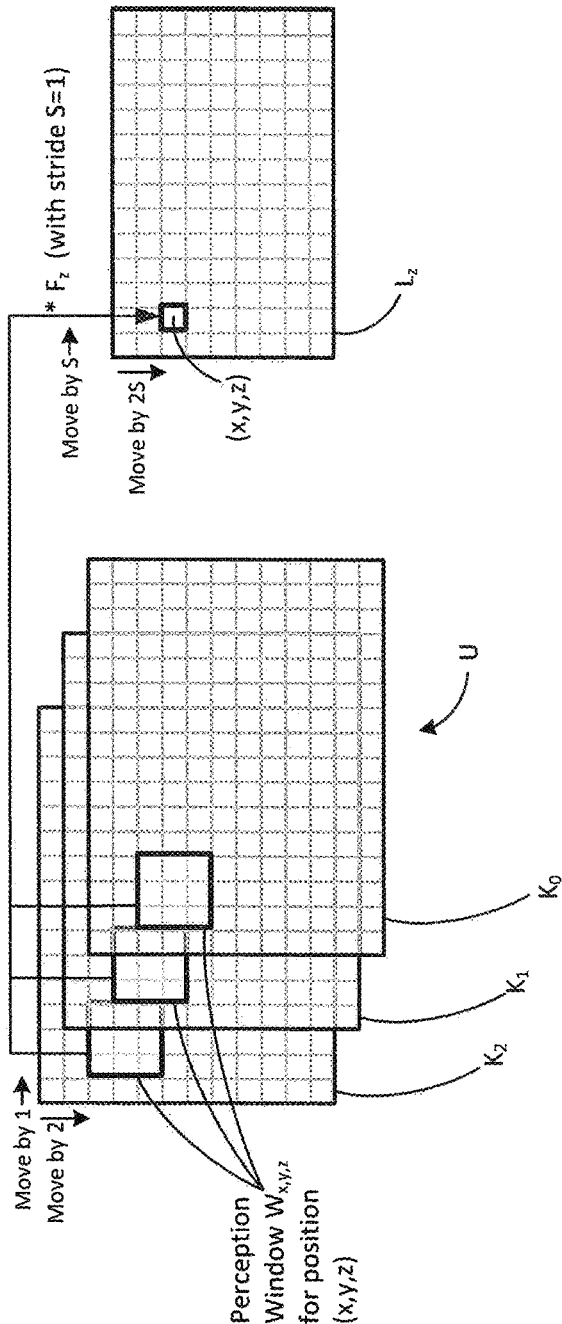
FIGS. 7A and 7B show an example of a convolution process applied to an input volume in a convolutional neural network.
Figure 7B:
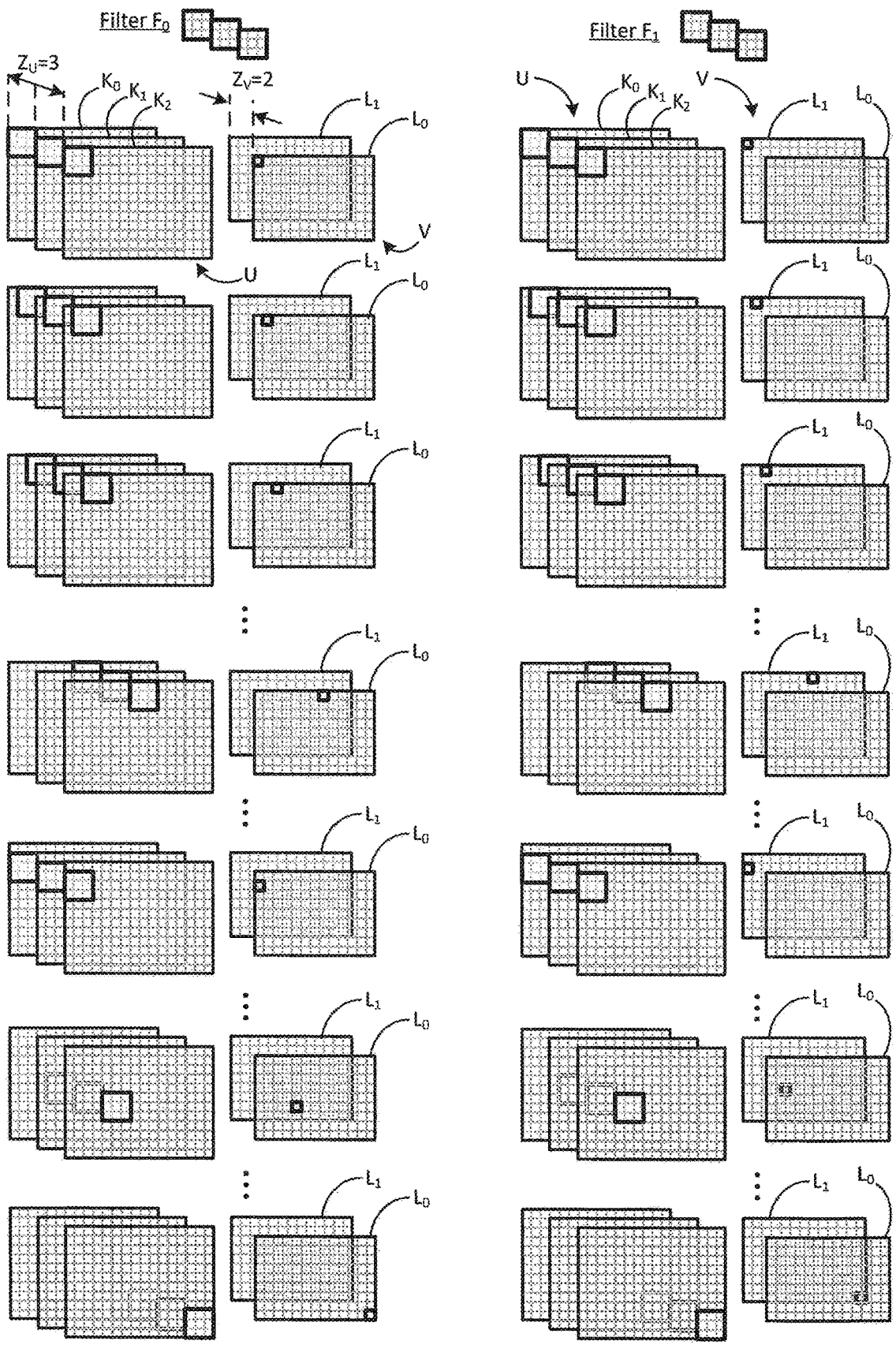

FIGS. 7A and 7B illustrate by example the principles of a convolution operation as applied at a convolution processing layer, to an input volume U of depth $Z_U$ to generate an output volume V of depth Z. This involves applying a set of 4 filters at the convolution layer, denoted:

$$F=\{F_z | z=0, \ldots, Z_V-1\}.$$

That is, the z dimension of the output volume V corresponds to the set of filters applied at the layer in question, and the depth of the output layer V matches the number of filters applied at the convolution layer that computes V. Each data layer $L_z$ of the output volume V is computed by applying a set of localized convolutions to the input volume U with the corresponding filter $F_z$. For this reason the z direction is referred to herein as the filter direction in the context of an output volume V computed by convolution.

The node at any given location (x,y,z) in the convolutional layer applies the applicable filter $F_z$ to its inputs in the following manner. The filter $F_z$ is defined as a three-dimensional array of weights having a size X×Y×Z where X, Y and Z are integers denoting the width, height and depth of the filter. The filter can be represented in mathematical shorthand as:

$$F_z = (w_{z,x',y',z'}) x'=0, \ldots, X-1$$

$$y'=0, \ldots, Y-1$$

$$z'=0, \ldots, Z-1$$

where $w_{z,x',y',z'}$ is the weight of filter $F_z$ at position (x', y', z'). Different filters applied in a given convolution layer can have different widths X and/or heights Y, however typically each filter is chosen to have a depth Z that matches the depth $Z_U$ of the input volume U to which it is applied. That is, typically each filter $F_z$ is applied across the full depth of the input volume U. The value $v_{x,y,z}$ of the output volume V at position (x,y,z) is computed by the node at position (x,y,z) in the convolution layer as a convolution of the filter $F_z$ and a localized portion of the input volume U of matching size X×Y×Z that is within a "perception window" $W_{x,y,z}$ of the filter for that position (x,y,z), defines as:

$$v_{x,y,z}=F_z*W_{x,y,z}(U);$$

$$W_{x,y,z}(U)=(u_{Sx+x',Sy+y',z'}) x'=0, \ldots, X-1$$

$$y'=0, \ldots, Y-1$$

$$z'=0, \ldots, Z-1$$

where $W_{x,y,z}(U)$ is the portion of the input volume U within the perception window $W_{x,y,z}$ at (x,y,z). This localization aspect can be equivalently stated as follows: the convolution layer that generates V is partially connected to the layer that outputs U (other layer), in that the node at each position (x,y,z) in the convolution layer is only connected to the nodes in the other processing layer that are within the perception window for that position (x,y,z), i.e. the nodes that output $W_{x,y,z}(U)$. Note that this does not preclude that node from additionally being partially or fully connected to one or more additional processing layers, for example via one or more skip connections from earlier layer(s) (see below) and/or one or more feedback connections from later layer(s).

In the above, * denotes convolution and S is an integer called the "stride" with which the filter $F_z$ is applied. As noted above, $v_{x,y,z}$ denotes the value in data layer $L_z$ of V at position (x,y), with that data layer $L_z$ corresponding to the filter $F_z$. The stride S defines a "resolution" of the convolution operation, in that it defines the extent to which overlapping portions of the input volume U are considered. With reference to FIG. 7B, the convolution operation can be conceptualized as 'sliding' the filter's perception window by S in the x direction and y direction with each unit increment in the x and y directions respectively, as illustrated by example in FIG. 7A. In FIG. 7B two filters $F_0$ and $F_1$ are applied to an input volume U of depth three, both with stride S=1, so as to generate an output volume U of depth two, with data layers $L_0$ and $L_1$ corresponding to filters $F_0$ and $F_1$ respectively, in the manner shown in FIG. 7B. However, different strides S can be applied for different filters $F_z$ (and different strides $S_1$, $S_2$ could even be applied in the x and y directions). The convolution is a sum of the values of the input volume U within the perception window weighted by the filter weights:

$$v_{x,y,z} = F_z * W_{x,y,z}(U) = \sum_{x',y',z'} w_{z,x',y',z'} u_{Sx+x',Sy+y',z'}.$$

As can be seen, this is equivalent to the weighted sum computed by nodes in a classical neural network, but restricted to the perception window of the filter. It is this restriction that means that (x,y) position in formation is retained, at least to some extent, as successive convolutions are applied within the network. Another difference with aspect to a classical neural network architecture is that, for a given depth z in a convolution layer, each node applies the same filter and hence the same set of weights (whereas in a classical network each node applies its own set of weights). In the context of structure recognition, this builds in an assumption that structure to be recognized is equally likely to appear anywhere within an image. Where that assumption is not desired, this restriction could be lifted, and different nodes at the same depth z but different (x,y) positions within a processing layer could be permitted to apply different filters.

The data layer $L_z$ for a given z as generated by convolution is referred to as a "feature map" for filter z. Each filter corresponds to a particular structural feature, and, in the context of image processing, the feature map for that filter is in effect a map of where that structural feature occurs within an image.

When convolution is applied to an image directly in this way, each filter operates as a low-level structure detector, in that "activations" (i.e. relatively large output values) occur when certain structure is formed by the pixels within the filter's perception window (that is, structure which matches a particular filter). However, when convolution is applied to a volume that is itself the result of convolution earlier in the network, each convolution is performed across a set of feature maps for different features, therefore activations further into the network occur when particular combinations of lower level features are present within the perception field. Thus with each successive convolution, the network is detecting the presence of increasingly high level structural features corresponding to particular combinations of features from the previous convolution. Thus in the early layers the network is effectively performing lower level structure detection but gradually moves towards higher level semantic understanding of structure in the later layers. The filter weights are learned from annotated examples in training, which is how the network learns what structure to look for.

As is known per se, convolution can be used in conjunction with other operations. For example, pooling and non-linear transformations are typical operations that are used in conjunction. Pooling is a form of dimensionality reduction, as is known in the art.

Non-linear transformation are introduced into the network in order to harness the full potential of its architecture. One example of an effective non-linear function that can be used is rectification (ReLu), which returns zero for a negative input value and the input value for a positive input value. However there are different ways in which non-linearity can be introduced into the network.

A non-linear function g can be conveniently applied as an activation function at a convolutional processing layer, to provide an output volume V' given by:

$$V'=g(V)=(V)=(v_{x,y,z}')$$

where $v_{x,y,z}'$ is the value of V' at position (x,y,z), and $(v_{x,y,z}')$ denotes the 3D array of such values.

Another non-linear activation function that can be used is a softmax function (g=softmax):

$$v'_{x,y,z} = \left( \frac{\exp(v_{x,y,z})}{\sum_{z'} \exp(v_{x,y,z'})} \right)$$

That is, the value of V' at position (x,y,z) is an exponential of the value $v_{x,y,z}$ at matching position (x,y,z) in V, normalized across the depth of V. A consequence of this normalization is that the values of V' at any given (x,y) position sum to unity across the depth dimensions z:

$$\sum_z v'_{x,y,z} = 1$$

This in turn means that the set of values across the depth of V' at (x,y), i.e.:

$$\{v_{x,y,z}'|z=0,\ldots,Z_y\}$$

can be interpreted as a probability distribution over $0, \ldots, Z$, which in turn can be interpreted as classes, such that $v_{x,y,z}'$ can be interpreted as a probability of the pixel at position (x,y) in the original image—denote $P_{x,y}$—belonging to class $A_z$, i.e.:

$$v_{x,y,z}'=\Pr(P_{x,y} \in A_z)$$

In other words, the feature map provided at the output layer provides a probability distribution over the input image at the pixel level, with each point in the feature map being a softmax probability output for the corresponding pixel and image structure class (referred to herein as a softmax feature map or, more generally, classification feature map), thereby achieving the desired segmentation.

A convolution layer with a softmax activation function may thus be referred to as a probabilistic (softmax) classifier or softmax layer herein.

Figure 8:
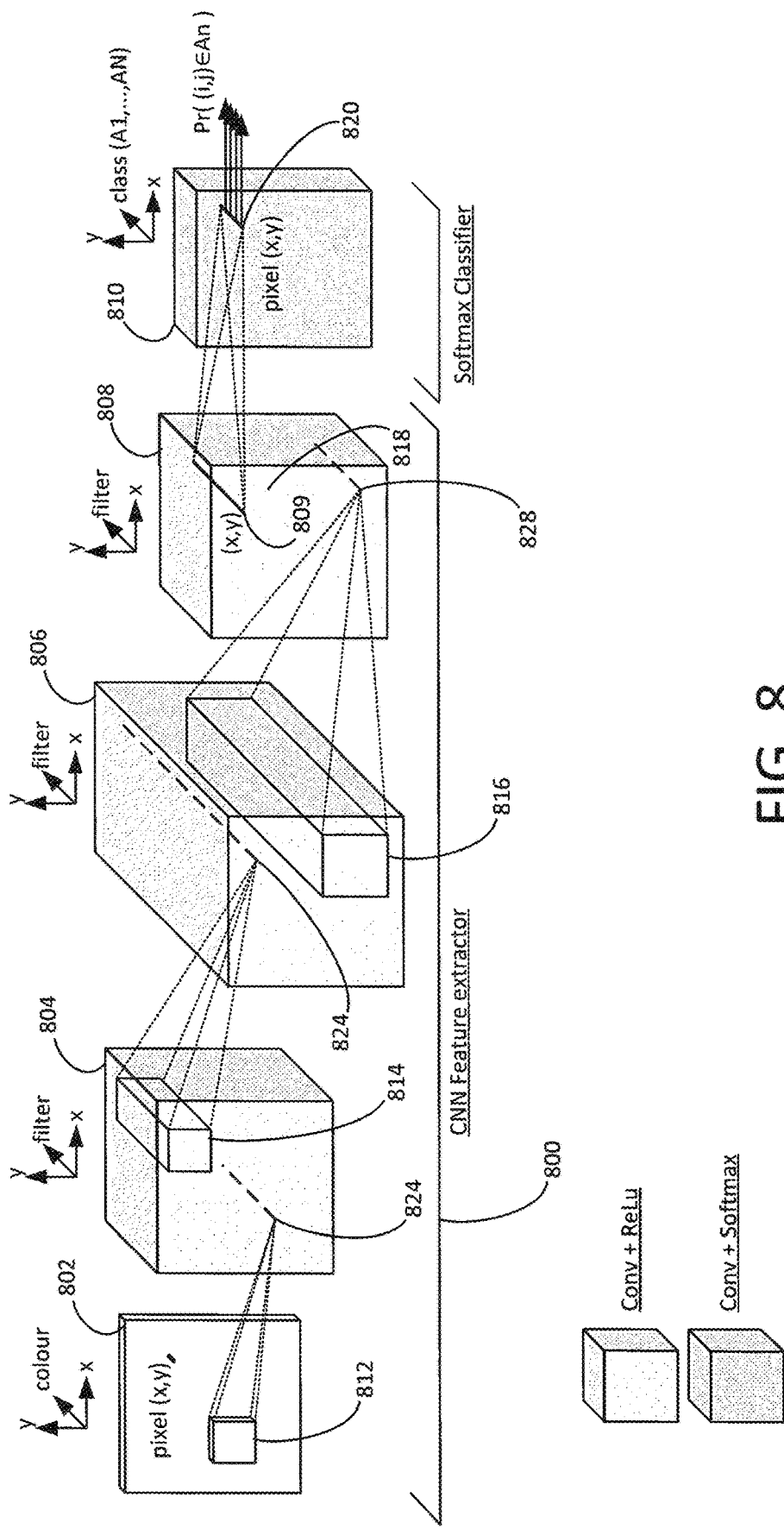
FIG. 8 shows a schematic block diagram of an example image segmentation network.

CNN-Based Segmentation:

How these principles can be applied to the problem of road structure-based image segmentation will now be described with reference to FIG. 8. FIG. 8 shows a convolutional neural network having five processing layers 802 (input layer), 804, 806, 808 (hidden layers) and 810 (output layer). In accordance with the principles set out above, there are represented as volumes. The nodes within those volumes are not shown individually, but correspond to individual points within those volumes.

An image (not shown) is received at the input layer 802 and passed to the first hidden layer 804 for processing. Each of the hidden layers 804, 806 and 808 applies convolution with ReLu activation (or other non-linear activation) to the input volume (not shown) from the previous layer. The output layer 810 also applies convolution to the input volume (not shown) from the final hidden layer 808, but with softmax activation, so that it operates as a softmax classifier as described above. Each node of the softmax layer 810 at (x,y) is connected to the 1×1×Z volume of nodes at (x,y) in the final layer 808 of the feature extractor 808, Z being the depth of that layer 808. The output values of this volume, labelled 809, constitute a semantically-rich feature vector for the pixel at (x,y), which is used by the softmax classifier 810 to classify that pixel.

The input and hidden layers 802-808 are an example of a CNN feature extractor as that term is used herein, which cooperate to extract features from the input image for classification by the softmax layer 810. The CNN feature extractor is labelled 800 in FIG. 8. In each of the convolution layers 804-810, nodes are partially connected to nodes in the previous layer and apply convolution to the outputs of those nodes as described above. By way of example, the points labelled 824, 826, 828 and 820 in layers 804, 806, 808 and 810 respectively correspond to individual nodes, each of which is connected to a subset of the nodes in the previous layer, denoted 812, 814, 816 and 818 respectively, as defined by the perception field of the relevant filter.

The network is trained using annotated images such that the output of the softmax layer 810 at position (x,y) across its depth provides a probability distribution over a set of desired image structure classes, 'running along' the z dimension of the softmax layer 810. In FIG. 8, the set of classes is denoted {A1, ..., AN}, where AN is the depth of the softmax layer. Thus the full set of nodes within the softmax layer 810 provide a probability distribution over the desired image structure classes at every point (pixel) within the original image, thereby achieving the desired segmentation.

Figure 9:
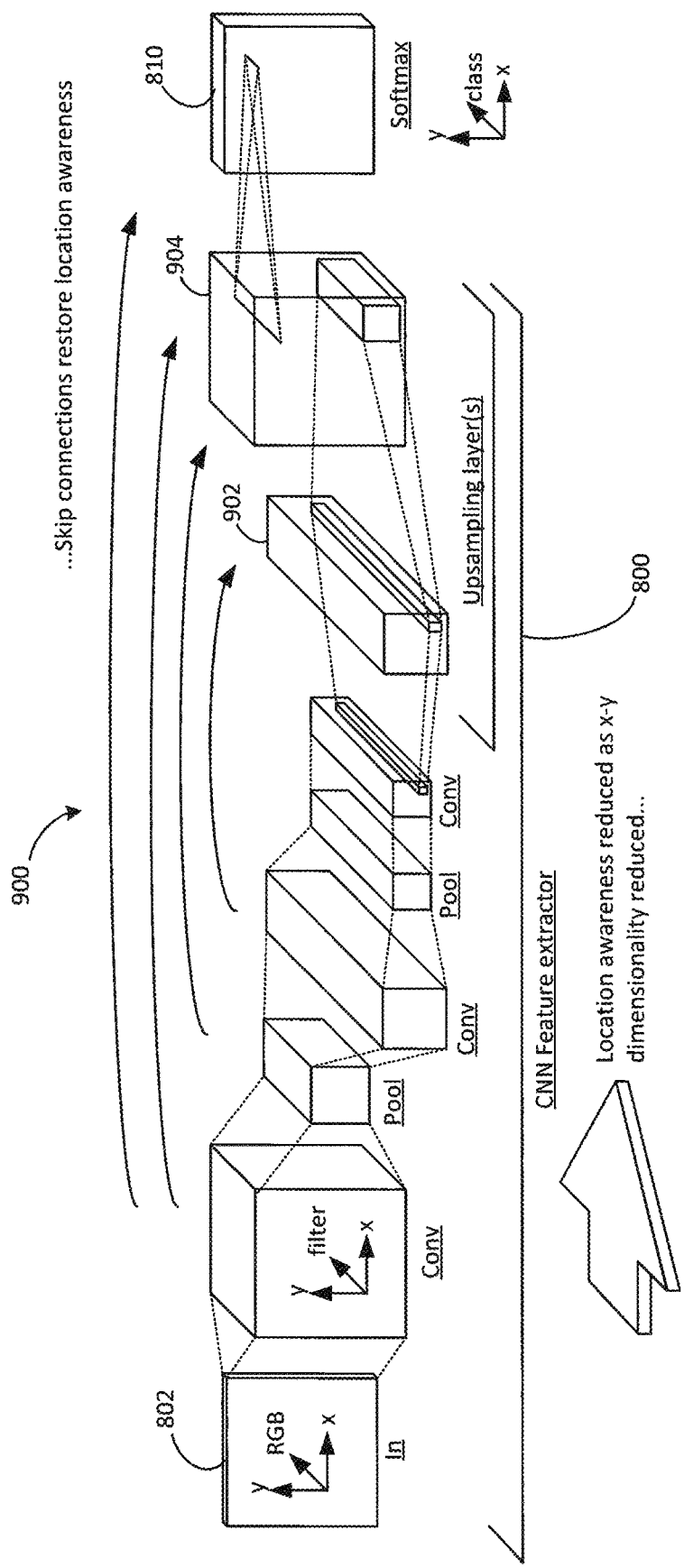
FIG. 9 shows a schematic block diagram of an example image segmentation network that incorporates pooling and skip connections.

FIG. 9 illustrates a CNN feature extractor 800, in which pooling is incorporated along with one or more upsampling layers (902, 904 in this example) and "skip connections" 900. An upsampling layer is a layer that upsamples an input volume U so as to increase its (x,y) dimensions (it may simultaneously reduce its depth if desired). Upsampling cannot restore (x,y) location information from volumes in which that information has been lost, and the function of the skip connections is to provide such location information directly from earlier layer(s) to the upsampling layer(s) at the end of the network, "skipping over" the intermediate layers at which (x,y) location information is discarded. This information is incorporated into the upsampling process, so as to ultimately combine the pixel-level location information received from the earlier layer(s) with the semantic understanding of image structure provided by the later layers. There are a number of possible upsampling functions that can be used, one example being transpose convolution.

In this example, the final layer 904 of the feature extractor 800 has (x,y) dimensions that match the (x,y) dimensions of the input layer, and thus the input image, such that each (x,y) position within the final layer 904 corresponds to the pixel at position (x,y) in the original image.

Hierarchical CNN-Based Segmentation:

CNN-based segmentation is known per se, therefore further details are only described herein to the extent it is helpful in understanding how CNN-based segmentation can be applied to a hierarchical image classification scheme in accordance with the present invention.

Figure 10A:
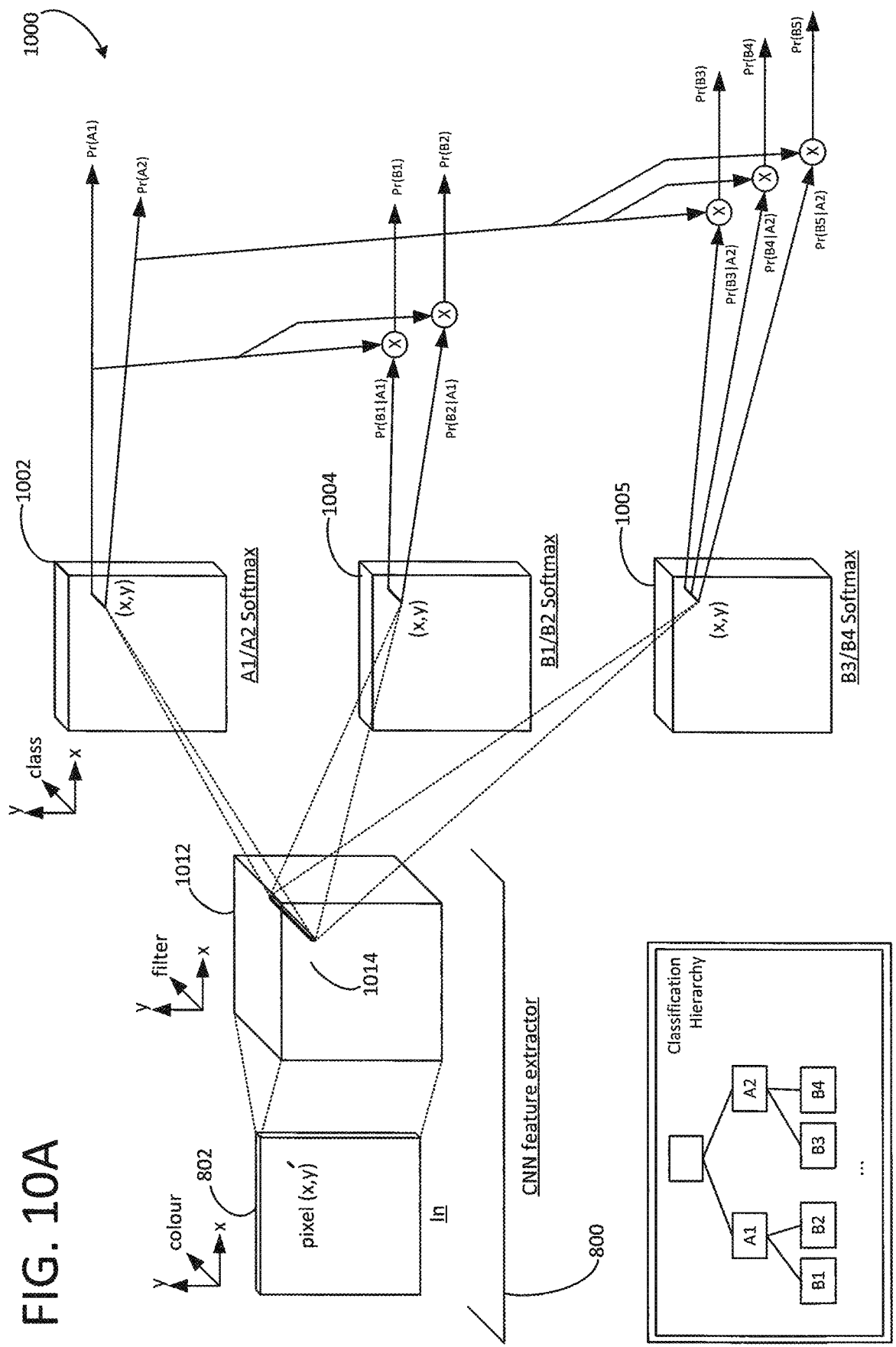
FIGS. 10A and 10B show schematic block diagrams of a hierarchical image segmentation network in an embodiment of the invention.
Figure 10B:
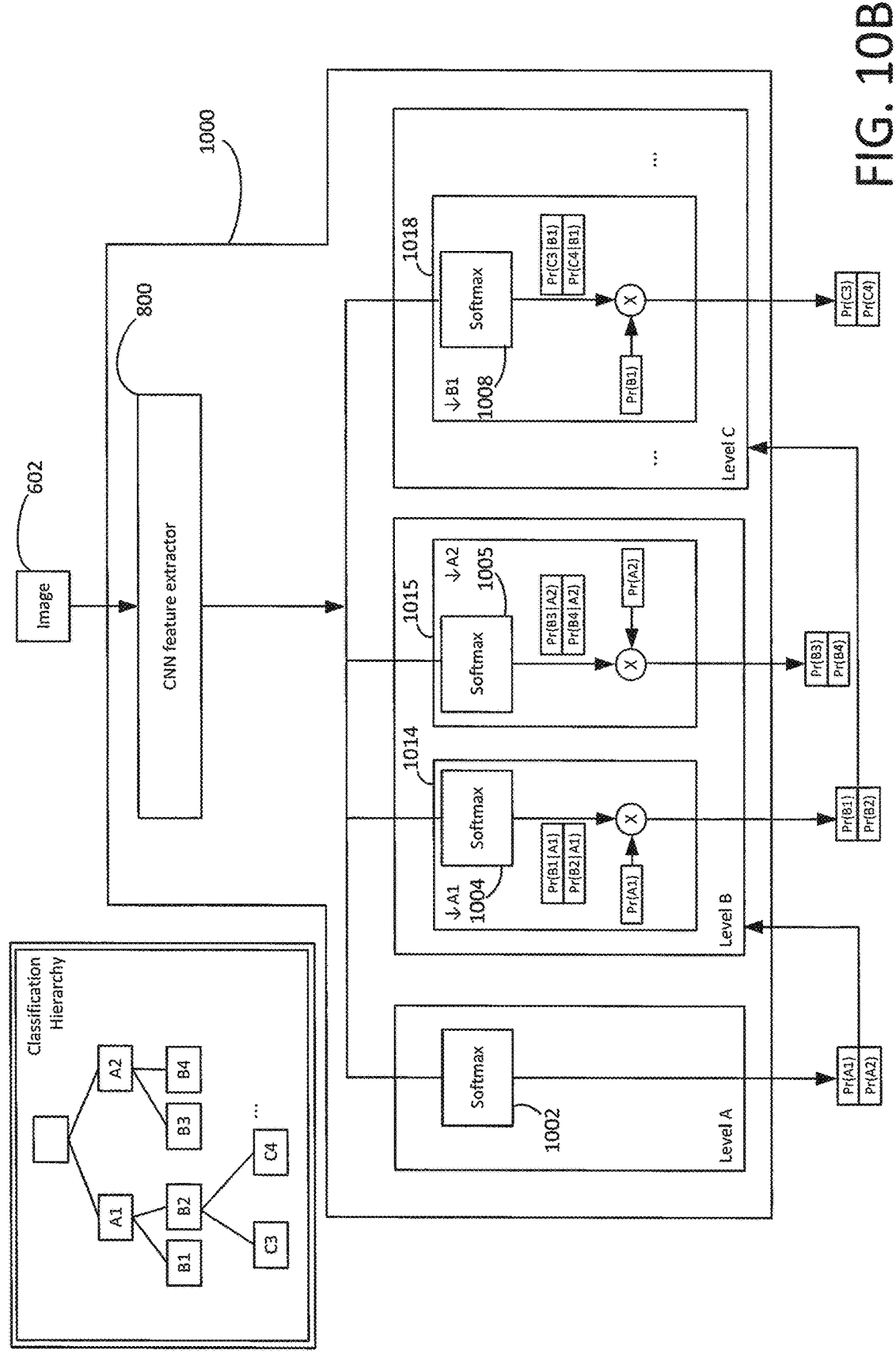

FIGS. 10A and 10B show schematic block diagrams of an example hierarchical image segmentation network 1000 for the structure detection component 102, which operates to classify images at the pixel level in accordance with a hierarchical classification scheme of the kind described above.

The hierarchical image segmentation network 1000 is shown to comprise a CNN feature extractor 800 of the kind described above with reference to FIGS. 8 and 9. The internal structure of the CNN feature extractor is omitted altogether from FIG. 10B, and FIG. 10A shows only the input layer 802 and final layer 1012 (corresponding to layer 810 in FIG. 8 and layer 904 in FIG. 9) of the CNN classifier 800.

In order to provide hierarchical classification, a plurality of softmax layers are provided, each operating according to the same principles as the softmax layer 810 of FIGS. 8 and 9. That is, each of which is a convolution layer with softmax activation that is partially connected to the final hidden layer 1012 of the CNN feature extractor 800. Only three softmax classification layers 1002 (level A), 1004 and 1005 (level B) are shown in FIG. 10A; FIG. 10B shows an additional softmax classification layer 1008 (level C). However, it will be appreciated that any plural number of softmax classification layers can be provided, where that number is dictated by the desired hierarchical classification scheme, as will become apparent in view of the following.

As shown in FIG. 10A, in each softmax classifier 1002, 1004, 1004, the nodes that lie along the z-axis at position (x,y) cooperate to provide a probability distribution for the corresponding pixel at (x,y) in the original image (corresponding to the node at position (x,y) in the input layer 802) over a respective set of image structure classes that run along the z-axis of that softmax layer. In each of the softmax classifiers 1002, 1004, 1006, the node at (x,y) in each data layer is shown connected to a localized 1×1×Z volume 1004 of the nodes lying at (x,y) and along the z-axis of the final layer 101 of the CNN feature extractor 800.

Accordingly, each softmax node along the z axis at position (x,y) in each of the softmax layers 1002, 1004 and 1006 receives a set of output values from the localized 1×1×Z volume of nodes 1004 in the final layer 1002 of the CNN feature extractor 800 to which it is connected. As noted, those outputs constitute a semantic feature vector (feature set) for the pixel at position (x,y) in the image. This is sometimes referred to as a pixel embedding. The feature set is a semantically rich representation of the pixel at (x,y) that takes into account related pixels in the image in a region (area or volume) surrounding that pixel. It is this feature set for pixel (x,y) that is used by that classification node to classify that pixel with respect to the image structure classes in question. The partial connections are such that, given any classification node at a particular (x,y) position in a given softmax layer, the partial connections to that classification node can be traced back through the feature extractor 800 to a patch (limited area or volume) surrounding the pixel at (x,y) in the original image. The patch corresponds to the nodes of the input layer 802 to which that classification node is indirectly connected via intermediate nodes of the feature extractor 800, and possibly directly via skip connections. In that case, the feature set for that pixel constitutes a semantically rich representation of that pixel that takes into account the context provided by the surrounding image patch.

A benefit of using this type of CNN feature extractor architecture is that it can create and represent feature sets for different patches very efficiently by avoiding duplicate processing and duplication of values (much more efficiently than by treating each patch as a separate image to be classified, which would be another way of building a pixel-level classifier).

The hierarchical aspect of the classification is accommodated by training a number of the softmax classifiers to compute conditional probability distributions. In the example of FIGS. 10A and 10B, the first softmax classifier 1002 is a parent-level classifier (at "level A") which classifies pixels with respect to two image structure classes A1 and A2, such as "drivable" and "non-drivable" (classes A1 and A2 in FIG. 4). The second softmax classifier 1004 is a child-level classifier (at "level B") which classifies pixels with respect to classes B1 and B2 which are children of class A1 (drivable), such as "lane" and "marking" (classes B1 and B2 FIG. 4). The third softmax classifier 1006 is a child-level classifier (also at "level B") which classifies pixels with respect to classes B3 and B4 which are children of class A2 (non-drivable), such as "pavement" and "hatched" (classes B3 and B4 in FIG. 4). The fourth softmax classifier 1008, shown only in FIG. 10B, is a child-level classifier (at "level C") which classifies pixels with respect to classes C1 and C2, which are children of class B1 (lane), such as "ego lane" and "non-ego lane" (classes C3 and C4 in FIG. 4). It is noted that in this example, class B1 at least is both a parent-level class (as a parent of C1 and C2) and a child-level class (as a child of class A1).

A child level classifier is trained to compute for the pixel at each location (x,y) in the original image a conditional probability distribution over a subset of child classes, wherein each of those child classes has a common parent class. The conditional probability distribution provides for each of the subset of child classes a probability of a pixel belonging to that child class given that (i.e. on condition that) it belongs to that common parent class. Following the example of FIG. 4, the softmax classifiers are trained to classify the pixel at (x,y) as follows:

| First classifier 1002 (A1/A2) | Pr(A1) |
| | Pr(A2) |
| Second classifier 1004 (B1/B2) | Pr(B1 | A1) |
| | Pr(B2 | A1) |
| Third classifier 1006 (B3/B4) | Pr(B3 | A2) |
| | Pr(B4 | A2) |
| Fourth classifier 1008 (C1/C2) | Pr(C1 | B1) |
| | Pr(C2 | B1) | etc.

In the above:

Pr(C) is shorthand notation for the probability that pixel $P_{x,y}$ belongs to class C, i.e. $Pr(P_{x,y} \in C)$ in the full notation introduced above; and Pr(C|D) is shorthand notation for the probability that pixel $P_{x,y}$ belongs to class C given that it belong to class D, i.e. $Pr(P_{x,y} \in C | P_{x,y} \in D)$ in the full notation introduced above.

This in turn allows the absolute probabilities of a given pixel $P_{x,y}$ belonging to the child classes to be computed in accordance with Bayes theorem as follows:

$$Pr(B1) = Pr(B1|A1) \times Pr(A1)$$

$$Pr(B2) = Pr(B2|A1) \times Pr(A1)$$

$$Pr(B3) = Pr(B3|A2) \times Pr(A2)$$

$$Pr(B4) = Pr(B4|A2) \times Pr(A2)$$

$$Pr(C1) = Pr(C1|B1) \times Pr(B1) = Pr(C1|B1) \times Pr(B1|A1) \times Pr(A1)$$

$$Pr(C2) = Pr(C2|B1) \times Pr(B1) = Pr(C2|B1) \times Pr(B1|A1) \times Pr(A1)$$

etc.

This is what is shown in FIGS. 10A and 10B, in which the output of each child level classifier is shown as inputted to an associated multiplication component, which also receives as input the absolute probability for the corresponding absolute parent class probability. With reference to FIG. 10B, each child-level softmax classifier may be referred to as a conditional probabilistic (softmax) classifier, which together with its associated multiplication component constitutes an absolute probabilistic (softmax) classifier that classifies pixels in relation to child-level classes in terms of absolute probabilities. The absolute softmax classifiers comprising the conditional softmax classifiers 1014, 1015, 1018 respectively are labelled 1014, 1015 and 1018 respectively in FIG. 10B.

Hierarchical Training

Returning briefly to FIG. 1, as described above, the goal of training is to teach (in this case) the road detection component 102 a function F(U) that it can apply to inputs U it has not encountered before, using a corpus of annotated (labelled) training data.

In this case, the training data are annotated street scene images, which are annotated in accordance with the hierarchical classification scheme to be learned. As such, individual pixels may be annotated as belonging to multiple classes in accordance with the hierarchy, in order to provide a hierarchical set of "ground truth" maps denoting the expected outputs at the various softmax classification layers 1002, . . . 1008 respectively. So, for example:

the ground truth feature map for a given image and the A1/A2 (drivable/non-drivable) classifier would separately mark drivable and non-drivable regions in that image;

the ground truth feature map for that image and the B1/B2 (lane/marking) classifier would separately mark the lane and marking regions of the drivable regions of that image;

the ground truth feature map for that image and the C1/C2 (ego lane/non-ego lane) classifier would separately mark the ego-lane and non-ego lane regions of the lane regions of that image;

etc.

Figure 11:
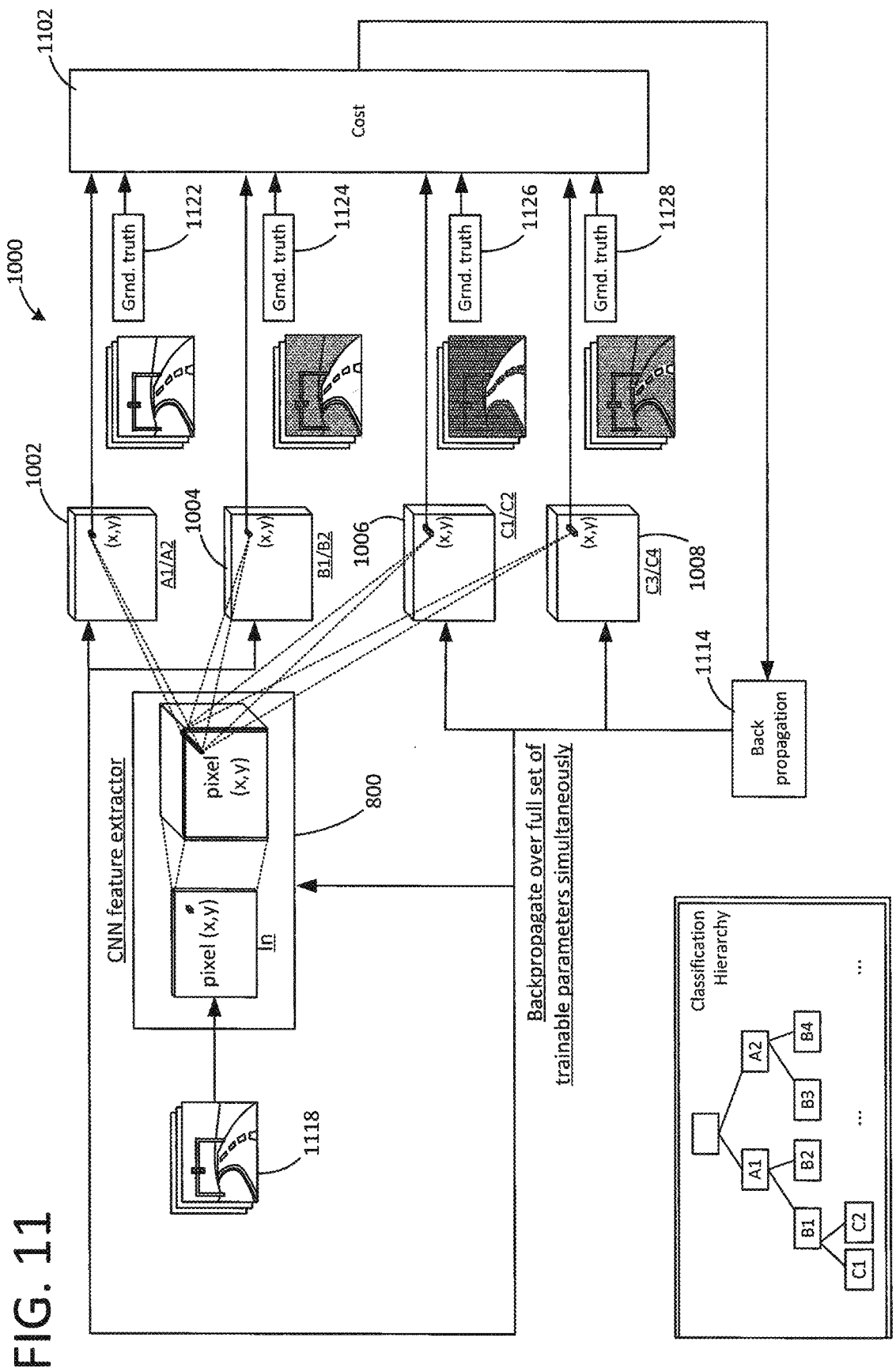
FIG. 11 shows a hierarchical image segmentation network in a training phase.

FIG. 11 shows a training system, of the kind depicted generally in FIG. 1, for training the segmentation network 1000 based on the ground truth feature maps. As noted, the CNN feature extractor 800 together with the multiple hierarchical softmax classifiers 1002, . . . , 1008 constitute the image segmentation network 1000 to be trained. The image segmentation network has a full set of trainable parameters, formed of the trainable parameters of the CNN feature extractor 800 together with the trainable parameters of each of the softmax classifiers 1002, . . . , 1008.

In FIG. 11, the ground truth feature maps for each training image 1116, as apply to softmax classifiers 1102 (A1/A2), 1104 (B1/B2), 1106 C1/C2) and 1108 (C3/C4) respectively, are labelled 1122, 1124, 1126 and 1128 respectively.

During segmentation training, the training image 1116 is passed into the feature extractor 800, which processes the image 1118 in accordance with its current parameters. The resulting outputs of the feature extractor 800 (i.e. the respective pixel feature sets) feed into each of the softmax classifiers 1002, . . . , 1008, which in turn processes the feature set it receives in accordance with its current parameters, to generate respective softmax feature maps as described above.

The segmentation training is based on backpropagation, performed over the full set of trainable parameters of the segmentation network 1000, i.e. over the network 1000 as a whole. Training is performed in cycles. In each training cycle a set of training images is passed through the network 1000, its performance is evaluated by determining the extent to which each softmax classifier 1002, . . . , 1008 was able to replicate the ground truth feature maps in its softmax output, and the full set of trainable parameters are adapted based on that evaluation of performance, for use in the next training cycle (until the process terminates).

Backpropagation is performed with respect to a cost function, as discussed briefly above with reference to FIG. 1. The cost function is designed to "penalize" the network 1000 for pixel classifications that deviate from the corresponding ground truth feature maps 1002, . . . , 1008 significantly. That is, it provides an overall measure of difference between the softmax outputs of the softmax classifiers 1002, . . . , 1008 and the corresponding ground truth maps 1122, . . . , 1128 (the cost or error). The objective of training is to minimize the cost function to the extent possible before overfitting occurs, i.e. to minimize the overall difference between the softmax feature maps as generated from the training images and the corresponding ground truth feature maps in this case.

In this case, the cost function is evaluated across the full set of softmax outputs from the set of softmax classifiers 1002, ..., 1008, i.e. taking those softmax feature maps as a whole. A cost function evaluation component 1102 is shown having inputs to receive the softmax outputs from the set of softmax classifiers 1002, ..., 1008 together with the corresponding ground truth feature maps. From these, the cost function evaluation component 1002 computes the gradients (partial derivatives) of the cost function with respect to the full set of trainable parameters, which in turn are used by a backpropagation component 1114 (corresponding to the training component 112 in FIG. 1) to adapt the full set trainable parameters (that is, the trainable parameters of the feature extractor 800 and those of the softmax classifiers 1002, ..., 1008), in accordance with a backpropagation algorithm. Backpropagation per se is well known in the art and is therefore not described in further detail herein.

It is noted that the full set of trainable parameters over which backpropagation is performed need not include every single parameter that it is possible to train, but rather refers to the all of the parameters across the components of the network 1000 that have been designated for training in the segmentation training. For example, certain parameters that are notionally trainable may be pre-trained parameters that are "frozen" during the segmentation training. For example, it is possible to pre-train a CNN to perform image-level classification, and then incorporate at least some of its "pre-trained" layers into a segmentation, i.e. pixel-level classification, network, as at least some of the feature recognition 'skills' learned in the image-level classification task can also be applied to image segmentation. This is a form of so-called transfer learning. Parameters that have been frozen in this way are an example of parameters that do not form part of the full set of trainable parameters as that term is used herein.

"Masking" in Hierarchical Training

Another component of the training is what is referred to herein as "masking".

Figure 12A:
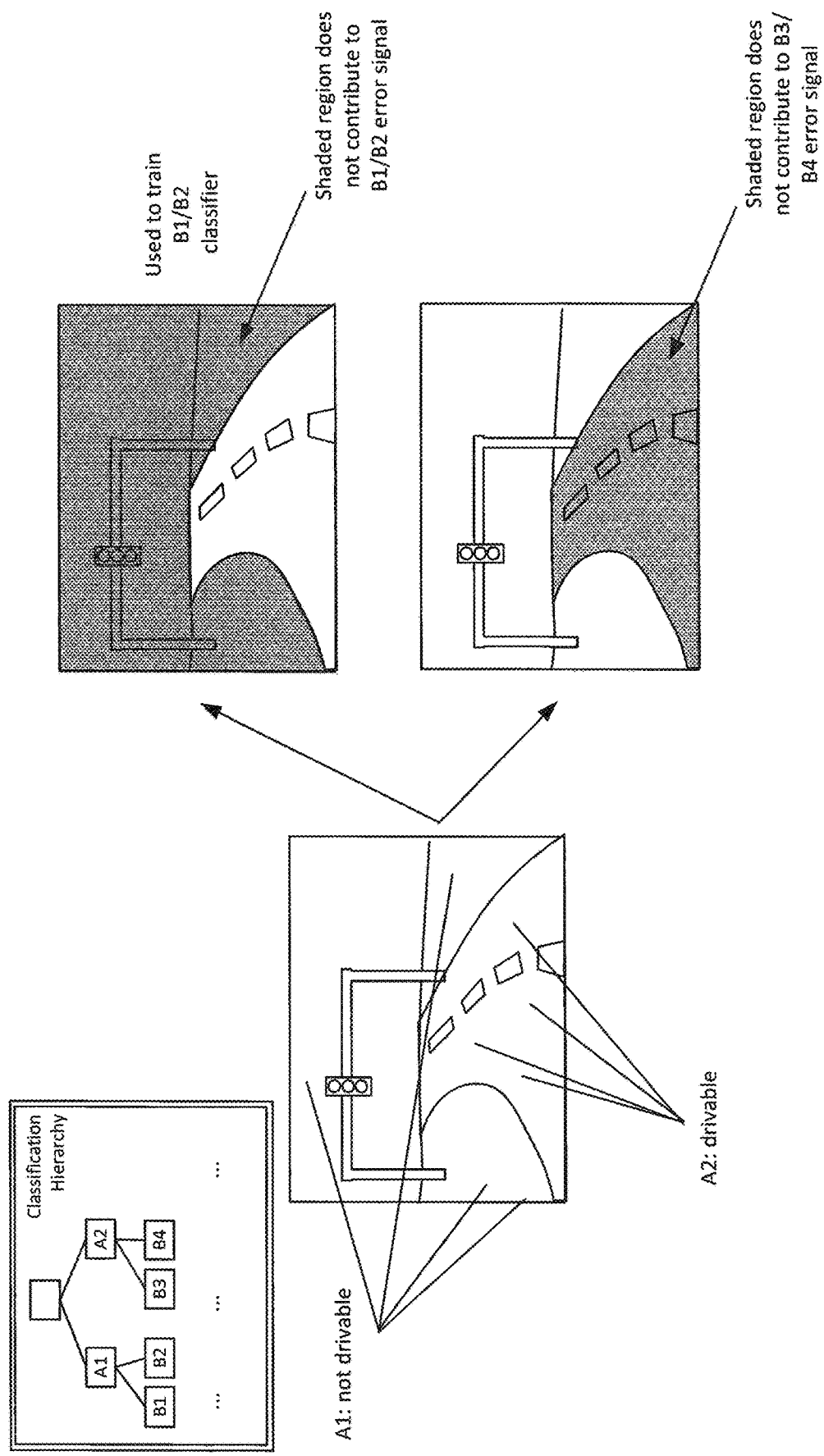
FIGS. 12A and 12B illustrate by example the principles according to which a cost function may be determined for training a hierarchical segmentation network.
Figure 12B:
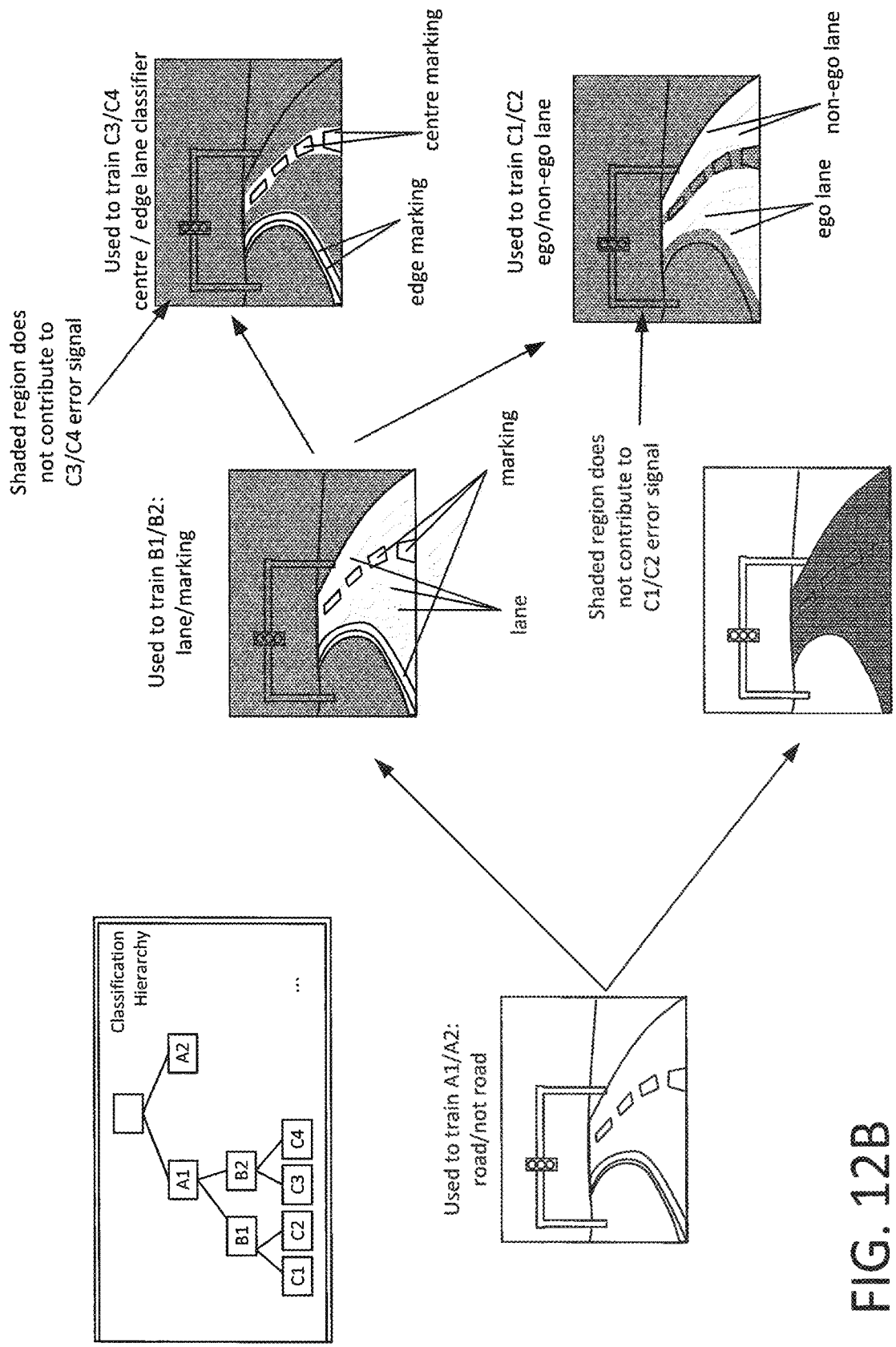

Masking refers to the fact that the cost function is defined such that there is no penalty incurred for any classification by a child-level classifier of a pixel outside of its parent class. That is, the cost function is defined such that child-level classifiers cannot be penalized for how they classify pixels that do not belong to their parent class. For example, the "lane"/"marking" (B1/B2) classifier 1004 cannot be penalized for how it classifies a pixel labelled as "non-drivable" (A2), and which is thus not labelled in relation to any of the "drivable" (A1) child classes. Likewise, the "centre marking"/"edge marking" (C1/C2) classifier cannot be penalized for how it classifies pixels that are not labelled as "marking" (e.g. lane pixels, and non-drivable pixels). This is illustrated by example in FIGS. 11 and 12A and 12B, in which shading is used to illustrate areas of an image which do not contribute to the cost function for a given classifier.

The cost function is formed by combining error signals defined for the classifiers 1002, 1004, 1006 and 1008 respectively. Each error signal encodes a measure of difference between the classification output of the relevant classifier, and the corresponding labels at the applicable level of the hierarchy. So in this example, the error functions are defined with respect to the applicable ground truth values as follows:

- the error signal for the drivable/non-drivable classifier 1002 provides a measure of difference between the individual pixel classifications determined by that classifier and the drivable/non-drivable (A1/A2) pixel labels, at level A of the hierarchy.
- the error signal for the lane/marking classifier 1004 provides a measure of difference between the individual pixel classifications determined by that classifier and the lane/marking pixel labels (B1/B2—children of class A1), at level B of the hierarchy. Only pixels which are labelled as drivable (A1) can contribute to this error signal, and it is independent of the pixels that are not labelled as belonging to the drivable class A1.
- the error signal for the ego/non-ego lane classifier 1006 provides a measure of difference between the individual pixel classifications determined by that classifier and the ego/non-ego pixel labels (C1/C2—children of class B1), at level C. Only pixels which are labelled as lane (B1) can contribute to this error signal, and it is independent of the pixels that are not labelled as belonging to the lane class B1.
- the error signal for the centre-marking/edge-marking classifier 1008 provides a measure of difference between the individual pixel classifications determined by that classifier and the centre-marking/edge-marking pixel labels (C3/C4—children of class B2), at level C. Only pixels which are labelled as marking (B2) can contribute to this error signal, and it is independent of the pixels that are not labelled as belonging to the marking class B2.
- etc.

These error signals are combined in an overall cost function, which is minimized in training.

In this example an image is shown in which every pixel is either annotated as road or not road, although this is not essential—some pixels could be entirely unlabeled in which case they do not contribute to the overall cost function at all.

As will be appreciated, the principles of hierarchical segmentation training that are described above can also be applied to machine learning models other than CNNs, such as other forms of neural network or different models altogether.

FIG. 13 shows an optional extension of the network, in which feature vector modification components 1202, 1204, 1205 and 1208 are incorporated for classes A1/A2, B1/B2, B3/B4 and C1/C2 respectively. Each of these is partially connected to the final layer of the feature extractor 800, and receives from the feature extractor 800 the feature vectors extracted for the image pixels. Each of these component 1202-1208 is a trainable component of the network, which can for example be formed by a small number of additional convolutional layers.

The idea is that each of these components is free to modify the feature vector extracted for each pixel to "refine" it for the purposes of the corresponding classification task. That is, to tailor it to the applicable classification task. Accordingly, the feature vector modification components 1202-1208 modify the feature vector for each pixel according to respective sets of feature vector modification parameters that are learned in training, to generate respective modified feature vectors for use by classifiers 1002-1008 respectively. These parameters are learned along with the other trainable parameters as described above.

The inventors have also recognized that the knowledge gained in tailoring the feature vectors to the task of classifying pixels in relation to a set of parent classes is also useful when it comes to those pixels in relation to the child classes of those parent classes. So for example, the knowledge gained by learning to tailor the feature vectors to drivable/ non-drivable (A1/A2) classification is useful both for lane/marking classification (B1/B2—children of A1) and for pavement/hatched region classification (B3/B4—children of A2). Similarly the knowledge gained by learning to tailor feature vectors to the lane/marking classification (B1/B2) is useful when it comes to the centre-lane/edge-lane classification task (C3/C4—children of B2). Etc. On the other hand, the more fine-grained knowledge learned in tailoring feature vectors to, say, the lane/marking classification task (B1/B2) is not expected to be especially useful in performing the coarser drivable/non-drivable (A1/A2) classification task. That is, knowledge gained further up the hierarchy in this context will also be useful lower down the hierarchy, but not vice versa.

This is exploited by selectively combining the modified feature vectors through concatenation. Specifically, the modified feature vector determined for a given set of parent classes is concatenated with the modified feature vector determined for each subset of child classes, to generate a combined (concatenated) feature vector for each subset of child classes.

Figure 13A:
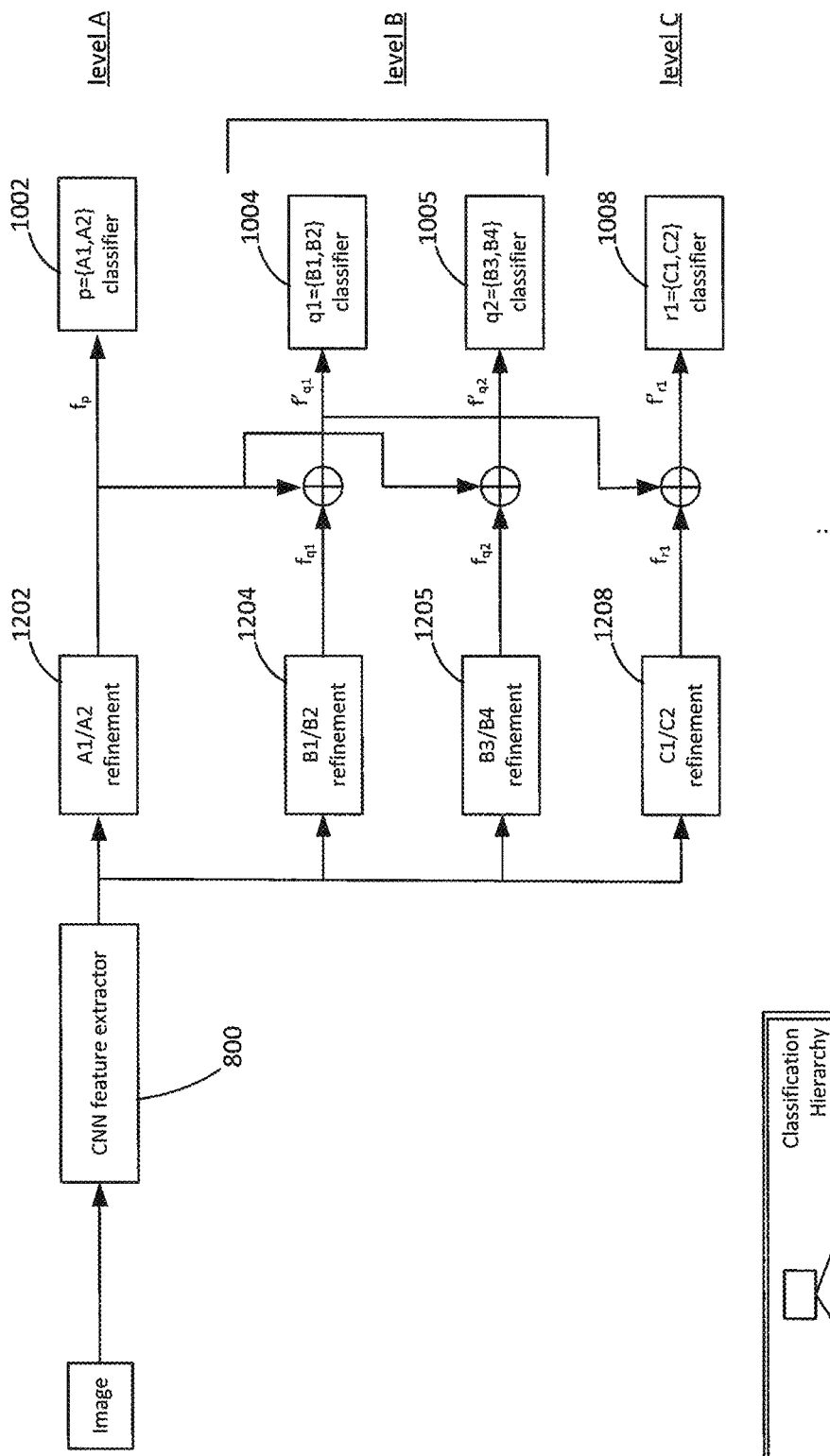
FIGS. 13A and 13B illustrate an extension in which modified versions of a pixel feature vector are determined and combined.
Figure 13A:
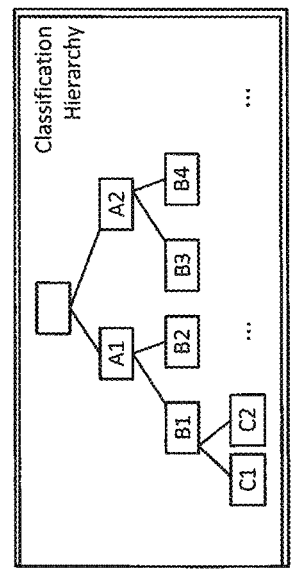
Figure 13B:
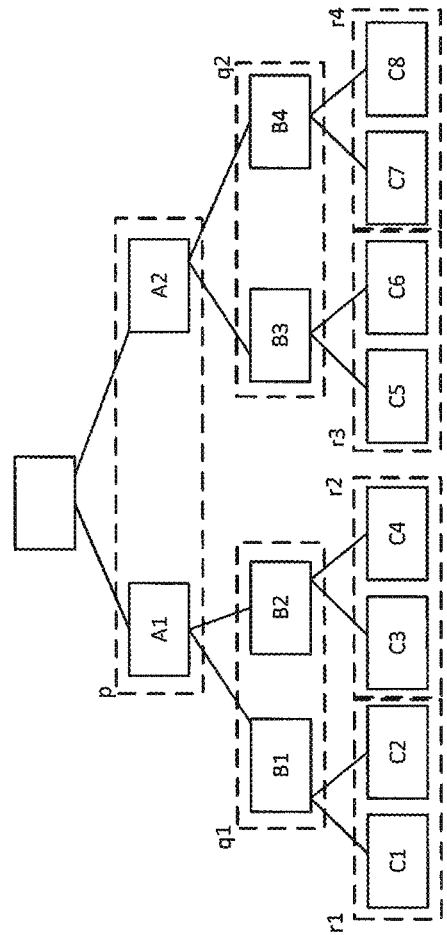
Figure 13B:
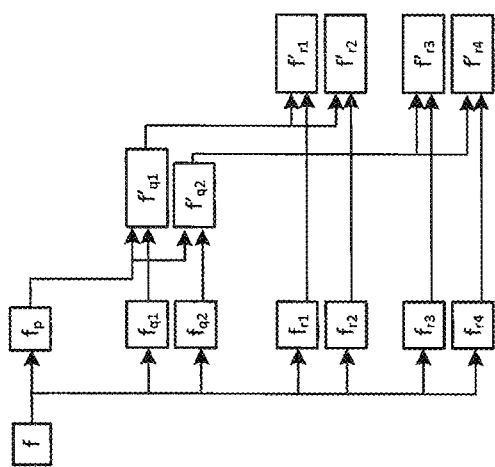

This is illustrated by example in FIGS. 13A and 13B, which shows how modified versions of the feature vector $f$ for a given pixel, as determined by the feature extractor 800, are determined and then concatenated ($\oplus$ denotes a concatenation) as follows:

$f \rightarrow f_p$ for the set of classes p={A1,A2}

$f \rightarrow f_{q1}$ for the set of classes q1={B1, B2} (child classes of A1$\in$p)

$f_{q1}' = f_{q1} \oplus f_p$, which is used to classify the pixel in relation to q1

$f \rightarrow f_{q2}$ for the set of classes q2={B3, B4} (child classes of A2$\in$p)

$f_{q2}' = f_{q2} \oplus f_p$, which is used to classify the pixel in relation to q2

$f \rightarrow f_{r1}$ for the set of classes r1={C1, C2} (child classes of B1$\in$q1)

$f_{r1}' = f_{r1} \oplus f'_{q1}$, which is used to classify the pixel in relation to r1

$f \rightarrow f_{r2}$ for the set of classes r2={C3, C4} (child classes of B2$\in$q1)

$f_{r2}' = f_{r2} \oplus f'_{q1}$, which is used to classify the pixel in relation to r2

$f \rightarrow f_{r3}$ for the set of classes r3={C5, C6} (child classes of B3$\in$q2)

$f_{r3}' = f_{r3} \oplus f'_{q2}$, which is used to classify the pixel in relation to r3

$f \rightarrow f_{r4}$ for the set of classes r2={C7, C8} (child classes of B4$\in$q2)

$f_{r4}' = f_{r4} \oplus f_{q2}$, which is used to classify the pixel in relation to r4

Etc.

The backpropagation component 1114 and feature vector modification components 1202-1208 are functional components of the system, in the sense defined above, which in a software implementation are implemented together with the segmentation network 1000 on one or processor of the training system (such as CPUs and/or GPUs), which can for example be a backend or other offline training system.

It will be appreciated that the above embodiments have been described only by way of example. Other embodiments and applications of the present invention will be apparent to the person skilled in the art in view of the teaching presented herein. The present invention is not limited by the described embodiments, but only by the accompanying claims.

The invention claimed is:

1. A computer system comprising:
one or more hardware processors configured to implement:
an input layer configured to receive a sequence of images, each image formed of a plurality of pixels, and
a plurality of classifiers configured to classify the pixels of each image according to a hierarchical classification scheme, in which at least some of those pixels are classified by a parent level classifier of the plurality of classifiers in relation to a set of parent classes, each of which is associated with a subset of child classes, and each of those pixels is also classified by at least one child level classifier of the plurality of classifiers in relation to one of the subsets of child classes, wherein each of the parent classes corresponds to a category of visible structure, and each of the subset of child classes associated with it corresponds to a different type of visible structure within that category,
wherein the one or more hardware processors are configured to perform an autonomous decision making process based on classification of the pixels of each image by the plurality of classifiers, and, in performing the autonomous decision making process, to:
detect a failure of the child level classifier to classify a first set of pixels of a first image of the sequence of images,
detect a successful classification by the parent level classifier of the first set of pixels of the first image,
responsive to detecting the failure of the child level classifier and the successful classification of the first set of pixels by the parent level classifier, determine a first set of possible actions that do not require a child-level classification of the first set of pixels,
autonomously select and implement a first action of the first set of possible actions,
detect a successful classification by the child level classifier of a second set of pixels of a second image of the sequence of images,
responsive to detecting the successful classification of the second set of pixels by the child level classifier, determine a second set of possible actions, and
autonomously select and implement a second action of the second set of possible actions, the second action having been excluded from the first set of possible actions responsive to the failure of the child level classifier to classify the first set of pixels of the first image.

2. The computer system of claim 1, wherein the decision making process is an autonomous vehicle control process, each action being an autonomous driving action.

3. The computer system of claim 1, wherein the one or more hardware processors are configured to implement a feature extractor, the feature extractor configured to generate a plurality of pixel feature vectors, each representing one of the pixels, based on that pixel and a set of the pixels related thereto, wherein the pixels are classified based on their pixel feature vectors.

4. The computer system of claim 3, wherein the set of related pixels is formed of the pixels in a portion of the image surrounding that pixel.

5. The computer system of claim 3, wherein the feature extractor is formed of one or more layers of a neural network.

6. The computer system of claim 5, wherein the feature extractor is formed of multiple layers of a convolutional neural network.

7. The computer system of claim 1, wherein the at least one child level classifier determines a child classification value for each of the subset of child classes.

8. The computer system of claim 1, wherein the parent level classifier and the child level classifier are probabilistic classifiers, which determine a probability distribution over the set of parent classes and the subset of child classes, respectively.

9. The computer system of claim 1, wherein each of those pixels is classified by at least one of: a first child level classifier in relation to a first subset of child classes associated with a first of the parent classes, or a second child level classifier in relation to a second subset of child classes associated with a second of the parent classes.

10. The computer system of claim 1, wherein each of at least some of the pixels is classified by the parent level classifier, the child level classifier, and at least one further child level classifier in relation to a further set of child classes, the further child level classifier being a child of the child level classifier in that each of the further set of child classes is a child of a child class in the subset of child classes within the hierarchical classification scheme.

11. The computer system of claim 1, wherein each of at least some of the pixels is classified by the parent level classifier, the child level classifier, and at least one further parent level classifier in relation to a further set of parent classes, the further parent level classifier being a parent of the parent level classifier in that each of the parent classes is a child of a parent class in the further set of parent classes.

12. A computer system according to claim 1, wherein:
the at least one child level classifier is configured to determine at least one child classification value that classifies that pixel in relation to a child class of that subset of child classes, and the parent level classifier determines at least one parent classification value that classifies that pixel in relation to the parent class with which that subset of child classes is associated, and
the at least one child level classifier is configured to determine for that pixel at least one conditional classification value in relation that child class that is conditional on that parent class, and determines the child classification value based on the conditional classification value and the parent classification value, wherein the at least one child level classifier determines the child classification value by multiplying the parent classification value with the conditional classification value.

13. The computer system of claim 12, wherein the parent and child classification values are values denoting a probability of that pixel belonging that parent class and that child class respectively.

14. The computer system of claim 13, wherein the conditional classification value is a value denoting a conditional probability of that pixel belonging to that child class on condition that it belongs to that parent class.

15. A computer program comprising computer readable instructions stored on a non-transitory storage medium and configured, when executed on one or more processors, to cause the one or more processors to implement:
an input layer configured to receive a sequence of images, each image formed of a plurality of pixels;
a plurality of classifiers configured to classify the pixels according to a hierarchical classification scheme, in which at least some of those pixels are classified by a parent level classifier of the plurality of classifiers in relation to a set of parent classes, each of which is associated with a subset of child classes, and each of those pixels is also classified by at least one child level classifier of the plurality of classifiers in relation to one of the subsets of child classes, wherein each of the parent classes corresponds to a category of visible structure, and each of the subset of child classes associated with it corresponds to a different type of visible structure within that category; and
performing an autonomous decision making process based on classification of the pixels of each image by the plurality of classifiers, wherein performing the autonomous decision making process comprises:
detecting a failure of the child level classifier to classify a first set of pixels of a first image of the sequence of images,
detect a successful classification by the parent level classifier of the first set of pixels of the first image,
responsive to detecting the failure of the child level classifier and the successful classification of the first set of pixels by the parent level classifier, determine a first set of possible actions that do not require a child-level classification of the first set of pixels,
autonomously select and implement a first action of the first set of possible actions,
detect a successful classification by the child level classifier of a second set of pixels of a second image of the sequence of images,
responsive to detecting the successful classification of the second set of pixels by the child level classifier, determine a second set of possible actions, and
autonomously select and implement a second action of the second set of possible actions, the second action having been excluded from the first set of possible actions responsive to the failure of the child level classifier to classify the first set of pixels of the first image.

16. A computer program according to claim 15, wherein:
the child level classifier is configured to determine at least one child classification value which classifies that pixel in relation to a child class of that subset of child classes, and the parent level classifier is configured to determine at least one parent classification value which classifies that pixel in relation to the parent class with which that subset of child classes is associated; and
the child level classifier is configured to determine for that pixel at least one conditional classification value in relation to that child class, which is conditional on that parent class, and is configured to determine the child classification value by multiplying the parent classification value with the conditional classification value.

* * * * *